US012626364B2

(12) United States Patent
Chang et al.

(10) Patent No.: US 12,626,364 B2
(45) Date of Patent: May 12, 2026

(54) MATERIALS AND METHODS RELATED TO IMAGE PROCESSING

(71) Applicant: Advanced Cell Diagnostics, Inc., Newark, CA (US)

(72) Inventors: Ching-Wei Chang, Newark, CA (US); Xiao-Jun Ma, Newark, CA (US); Han Lu, Newark, CA (US); Bing-Qing Zhang, Newark, CA (US); HaYeun Ji, Newark, CA (US); Ming Yu, Newark, CA (US)

(73) Assignee: Advanced Cell Diagnostics, Inc., Newark, CA (US)

( * ) Notice: Subject to any disclaimer, the term of this patent is extended or adjusted under 35 U.S.C. 154(b) by 275 days.

(21) Appl. No.: 18/555,654

(22) PCT Filed: Apr. 15, 2022

(86) PCT No.: PCT/US2022/024975
§ 371 (c)(1),
(2) Date: Oct. 16, 2023

(87) PCT Pub. No.: WO2022/221635
PCT Pub. Date: Oct. 20, 2022

(65) Prior Publication Data
US 2024/0212150 A1      Jun. 27, 2024

Related U.S. Application Data

(60) Provisional application No. 63/175,737, filed on Apr. 16, 2021.

(51) Int. Cl.
*G06T 7/194*          (2017.01)
*G06T 7/00*           (2017.01)
*G06T 7/174*          (2017.01)

(52) U.S. Cl.
CPC ............ *G06T 7/0012* (2013.01); *G06T 7/174* (2017.01); *G06T 7/194* (2017.01)

(58) Field of Classification Search
None
See application file for complete search history.

(56) References Cited

U.S. PATENT DOCUMENTS 3,817,837 A      6/1974   Rubenstein et al.
3,850,752 A      11/1974  Schuurs et al.
(Continued)

FOREIGN PATENT DOCUMENTS

WO      WO-2011094669 A1      8/2011
WO      WO-2020014036 A1      1/2020
(Continued)

OTHER PUBLICATIONS

Baharlou, Heeva, et al. "AFid: a tool for automated identification and exclusion of autofluorescent objects from microscopy images." Bioinformatics 37.4 (2020): 559-567. (Year: 2020).*
(Continued)

*Primary Examiner* — Sean M Conner
(74) *Attorney, Agent, or Firm* — Casimir Jones, S.C.; Peter J. Schlueter

(57) ABSTRACT

The present disclosure provides materials and methods related to image processing. In particular, the present disclosure provides methods for enhancing target signal detection using imaging processing analysis that identifies and removes non-specific background signals. The image processing methods of the present disclosure are useful for enhancing target signals in a variety of assays that involve fluorescent detection (e.g., fluorescent in situ hybridization, immunofluorescence).

18 Claims, 4 Drawing Sheets

(56) References Cited

U.S. PATENT DOCUMENTS

| | | | |
|---|---|---|---|
| 3,939,350 | A | 2/1976 | Kronick et al. |
| 3,996,345 | A | 12/1976 | Ullman et al. |
| 4,275,149 | A | 6/1981 | Litman et al. |
| 4,277,437 | A | 7/1981 | Maggio |
| 4,366,241 | A | 12/1982 | Tom et al. |
| 7,709,198 | B2 | 5/2010 | Luo et al. |
| 8,604,182 | B2 | 12/2013 | Luo et al. |
| 8,951,726 | B2 | 2/2015 | Luo et al. |
| 2008/0038725 | A1 | 2/2008 | Luo et al. |
| 2009/0081688 | A1 | 3/2009 | Luo et al. |
| 2011/0092381 | A1 | 4/2011 | Sood et al. |
| 2012/0100540 | A1 | 4/2012 | Wu et al. |
| 2013/0171621 | A1 | 7/2013 | Luo et al. |
| 2016/0196350 | A1* | 7/2016 | Mau .................. G06F 16/24578 707/706 |
| 2016/0247263 | A1* | 8/2016 | Mailhe ...................... G06T 5/70 |
| 2016/0345834 | A1 | 12/2016 | Hasan et al. |
| 2017/0101672 | A1 | 4/2017 | Luo et al. |
| 2019/0125190 | A1 | 5/2019 | Boppart et al. |
| 2021/0026121 | A1* | 1/2021 | Yamamoto ......... G01N 21/6428 |
| 2021/0164039 | A1* | 6/2021 | Wang .................. C12Q 1/6841 |

FOREIGN PATENT DOCUMENTS

| | | |
|---|---|---|
| WO | WO-2020168162 A1 | 8/2020 |
| WO | WO-2020257861 A1 | 12/2020 |

OTHER PUBLICATIONS

Korobchevskaya, Kseniya, et al. "Intensity weighted subtraction microscopy approach for image contrast and resolution enhancement." Scientific reports 6.1 (2016): 25816. (Year: 2016).*

Pang, Zhengyu, et al. "Autofluorescence removal using a customized filter set." Microscopy research and technique 76.10 (2013): 1007-1015. (Year: 2013).*

American Society of Cytopathology (ASC): "Non-Gynecological Cytology Practice Guideline," Adopted by the ASC Executive Board, Mar. 2, 2004, 53 Pages.

Anderson C. M., et al., "Fully Automated RNAscope In Situ Hybridization Assays for Formalin-Fixed Paraffin-Embedded Cells and Tissues," Journal of Cellular Biochemistry, Oct. 2016, vol. 117, No. 10, pp. 2201-2208.

Anderson C.M., et al., "Visualizing Genetic Variants, Short Targets, and Point Mutations in the Morphological Tissue Context With an RNA in Situ Hybridization Assay," Journal of Visualized Experiments, Aug. 14, 2018, No. 138, e58097, pp. 1-9.

Arnold M.M., et al., "Effects of Fixation and Tissue Processing on Immunohistochemical Demonstration of Specific Antigens," Biotechnic & Histochemistry, Sep. 1996, vol. 71, No. 5, pp. 224-230.

Battifora H., et al., "The Influence of Protease Digestion and Duration of Fixation on the Immunostaining of Keratins: A Comparison of Formalin and Ethanol Fixation," The Journal of Histochemistry and Cytochemistry, Aug. 1986, vol. 34, No. 8, pp. 1095-1100.

Brown A.J., et al., "New Technologies for Cervical Cancer Screening," Best Practice & Research Clinical Obstetrics and Gynaecology, Apr. 2012, vol. 26, pp. 233-242.

"Cecil Textbook of Medicine", Bennett and Plum, eds., 21st edition, WB Saunders, Philadelphia, 2000, TOC, 43 Pages.

"Cervical Cytology Practice Guidelines", Approved by the American Society of Cytopathology (ASC) Executive Board, Nov. 10, 2000, vol. 45, pp. 201-226.

Daniel S.G., et al., "Fast Tag Nucleic Acid Labeling System: a Versatile Method for Incorporating Haptens, Fluorochromes and Affinity Ligands Into DNA, RNA and Oligonucleotides", Biotechniques, Mar. 1998, vol. 24, No. 3, pp. 484-489.

Dey P., "Cytology Sample Procurement, Fixation and Processing," Basic and Advanced Laboratory Techniques in Histopathology and Cytology, Springer, 2018, pp. 121-132.

Dirks R.M., et al., "Triggered Amplification by Hybridization Chain Reaction," Proceedings of the National Academy of Sciences, USA, Oct. 26, 2004, DOI: 10.1073/pnas.0407024101, XP002995798, vol. 101, No. 43, pp. 15275-15278.

Extended European Search Report for application 22788993.8, mailed on Jan. 29, 2025, 11 pages.

Fox C.H., et al., "Formaldehyde Fixation," The Journal of Histochemistry and Cytochemistry, Aug. 1985, vol. 33, No. 8, pp. 845-853.

Gonzalez R.C., et al., "Digital Image Processing", Pearson, 4th Edition, 2018, 10 Pages, (TOC Only).

Hermanson G.T., "Bioconjugate Techniques," Science Direct, Academic Press, San Diego, 1996, TOC only, 2 pages.

Hicks D.G., et al., "In Situ Hybridization in the Pathology Laboratory: General Principles, Automation, and Emerging Research Applications for Tissue Based Studies of Gene Expression," Journal of Molecular Histology, Aug. 2004, vol. 35, No. 6, pp. 595-601.

International Search Report and Written Opinion for International Application No. PCT/US2022/024975, mailed Aug. 16, 2022, 8 Pages.

Johnson I., et al., "Molecular Probes Handbook—A Guide to Fluorescent Probes and Labeling Technologies", 11th Edition, Life Technologies, 2010, TOC only, 2 pages.

Kalof A.N., et al., "Our Approach to Squamous Intraepithelial Lesions of the Uterine Cervix," Journal of Clinical Pathology, May 2007, vol. 60, No. 5, pp. 449-455.

Liu F., et al., "Extraction of target fluorescence signal from in vivo background signal using image subtraction alorithm", International Journal of Automation and Computing, vol. 9, No. 3, Jun. 2012, pp. 232-236.

Manafi M., et al., "Fluorogenic and Chromogenic Substrates Used in Bacterial Diagnostics," Microbiological Reviews, Sep. 1991, vol. 55, No. 3, pp. 335-348.

Moffitt J.R., et al., "High-throughput Single-cell Gene-expression Profiling With Multiplexed Error-Robust Fluorescence in Situ Hybridization", Proceedings of the National Academy of Sciences USA, Sep. 27, 2016, vol. 113, No. 39, pp. 11046-11051.

Ramos-Vara J.A., "Technical Aspects of Immunohistochemistry," Veterinary Pathology, Jul. 2005, vol. 42, No. 4, pp. 405-426.

Sellors and Sankaranarayanan eds, Colposcopy and Treatment of Cervical Intraepithelial Neoplasia: A Beginners Manual, International Agency for Research on Cancer, Lyon, France. 2003. TOC only. 7 pages.

Shapiro, Practical Flow Cytometry. Wiley-Liss, New York. 2003. TOC only. 22 pages.

Shenoi B.A., "Introduction to Digital Signal Processing and Filter Design," Wiley-Interscience, 2006, 11 Pages (TOC only).

Sidorenko V.S., et al., "Correlated Cleavage of Single- and Double-Stranded Substrates by Uracil-DNA Glycosylase," FEBS Letters, Feb. 6, 2008, vol. 582, No. 3, pp. 410-414.

Stoler M.H., "In Situ Hybridization," Clinics in Laboratory Medicine, Mar. 1990, vol. 10, No. 1, pp. 215-236.

Wang F., et al., "RNA Scope: A Novel in Situ RNA Analysis Platform for Formalin-Fixed, Paraffin-Embedded Tissues," The Journal of Molecular Diagnostics, Jan. 2012, vol. 14, No. 1, pp. 22-29.

Waxman A.G., et al., "Revised Terminology for Cervical Histopathology and Its Implications for Management of High-Grade Squamous Intraepithelial Lesions of the Cervix", Obstetrics and Gynecology, Dec. 2012, vol. 120, No. 6, pp. 1465-1471.

Webster J.D., et al., "Effects of Prolonged Formalin Fixation on Diagnostic Immunohistochemistry in Domestic Animals," Journal of Histochemistry and Cytochemistry, Aug. 2009, vol. 57, No. 8, pp. 753-761.

Wilkinson D.G., et al., "In Situ Hybridization: A Practical Approach", IRL Press, Oxford University Press, (TOC Only), 1992, 8 Pages.

* cited by examiner

MATERIALS AND METHODS RELATED TO IMAGE PROCESSING

CROSS REFERENCE TO RELATED APPLICATIONS

This application claims priority to and the benefit of U.S. Provisional Patent Application No. 63/175,737 filed Apr. 16, 2021, which is incorporated herein by reference in its entirety and for all purposes.

FIELD

The present disclosure provides materials and methods related to image processing. In particular, the present disclosure provides methods for enhancing target signal detection using imaging processing analysis that identifies and removes non-specific background signals. The image processing methods of the present disclosure are useful for enhancing target signals in a variety of assays that involve fluorescent detection (e.g., fluorescent in situ hybridization, immunofluorescence).

BACKGROUND

Background fluorescence, such as tissue autofluorescence, is a long-standing challenge in the field of fluorescent-based imaging of cells and tissue samples, including protein detection methods (e.g., immunofluorescence (IF) and RNA detection methods (e.g., fluorescent RNA in situ hybridization (FISH), and co-detection of proteins and RNAs. Such assays utilize fluorescent dyes and fluorescent microscopes for target labeling and detection in the tissue context, respectively. Due to the inherent nature of autofluorescence within tissue samples, it interferes with detection of true signals in IF and FISH assays, especially when the signal of interests are low (e.g., less abundant). Tissue autofluorescence is widely observed in pathology samples prepared by widely used methods, such as in formalin-fixed paraffin-embedded (FFPE) tissue specimens, which is particularly prone to high tissue autofluorescence due to long fixation and processing steps involved. In addition, autofluorescence is present in some fixed frozen and fresh frozen tissues.

For example, tissue autofluorescence has been attributed to natural fluorescence that come from endogenous components in cells such as aromatic amino acids, lipopigments, the extracellular matrix components, as well as fluorescence generated during fixation procedures. In FFPE tissues, autofluorescence is observed from lysosomal digestion residues called lipofuscins, the ECM protein collagens and elastins, red blood cells, as well as from formalin fixation. Autofluorescence has broad excitation and emission spectra around the FITC and Cy3 channels, and thus hampers the clear visualization of fluorescent RNA and protein signals in these spectra.

Several methods have been developed to mitigate tissue autofluorescence. For example, the difference between signal intensity and autofluorescence background can be experimentally increased by boosting signal intensity (e.g., through the use of tyramide signal amplification), and/or by reducing autofluorescence background while preserving signal. Current commercially available products that employ an autofluorescent reduction strategy include Sudan Black, TrueBlack® and TrueView®. While they all reduce autofluorescence to certain extent, there are significant limitations with these products. For example, Sudan Black produces an undesired shifting of spectrum into the far-red channel; TrueBlack® specifically quenches lipofuscin autofluorescence but is not effective on autofluorescence produced from fixative background. TrueView efficiently quenches all sources of autofluorescence, but significantly dampens target signal intensity. Furthermore, these treatments have significant variation across different tissues, making it difficult to apply a universal and robust autofluorescence blocking procedure. Additionally, post-image processing can be performed to reduce autofluorescence using various methods, including spectral imaging and unmixing or autofluorescence removal software, (e.g., dotdotdot and AFid). However, these methods either require special, high-end microscopic setups or are only effective in removing highly autofluorescent sources such as red blood cells, but not in removing fixative-induced general background. Hence, there is a critical need to develop methods that mitigate the impact of tissue autofluorescence while maintaining the fluorescent signals from desired targets.

SUMMARY

Embodiments of the present disclosure include a method for enhancing detection of a target. The method includes imaging a sample comprising a target signal to create a probe image and imaging the sample comprising no target signal to create a background image. The method further includes modifying the background image to create an adjusted background image based on at least one image metric, and subtracting the adjusted background image from the probe image to create a final image comprising an enhanced target signal.

In some embodiments, the method further includes displaying the final image on a display.

In some embodiments, the target signal is obtained by subjecting the sample to a fluorescent in situ hybridization assay and/or an immunofluorescence assay.

In some embodiments, the background image comprising no target signal is obtained by removing the target signal from the sample.

In some embodiments, the method further includes determining an estimated location of the target signal in the probe image.

In some embodiments, the method further includes removing the estimated location from the probe image to create a first background-only image and removing the estimated location from the background image to create a second background-only image.

In some embodiments, the at least one image metric is a ratio factor of the first background-only image and the second background-only image.

In some embodiments, the ratio factor is a first intensity to a second intensity, wherein the first intensity is determined from the first background-only image and the second intensity is determined from the second background-only image.

In some embodiments, the first intensity is the mean of a plurality of pixel intensity values in the first background-only image, and the second intensity is the mean of a plurality of pixel intensity values in the second background-only image.

In some embodiments, the first intensity is the mean of all the pixel intensity values in the first background-only image, and the second intensity is the mean of all the pixel intensity values in the second background-only image.

In some embodiments, the first intensity is the median of a plurality of pixel intensity values in the first background-only image, and the second intensity is the median of a plurality of pixel intensity values in the second background-only image.

In some embodiments, the first intensity is the mean of a central 80% of all the pixel intensity values in the first background-only image, and the second intensity is the mean of a central 80% of all the pixel intensity values in the second background-only image.

In some embodiments, modifying the background image to create an adjusted background image includes scaling the background image by the ratio factor.

In some embodiments, the at least one image metric is a multiplication factor to account for local intensity differences. In some embodiments, the multiplication factor is within a range of 1.0 to 1.1.

In some embodiments, modifying the background image to create an adjusted background image includes scaling the background image by the multiplication factor.

In some embodiments, the at least one image metric is a local maximum value transform.

In some embodiments, the local maximum value transform includes a search radius within a range of 0 to 5 pixels.

In some embodiments, the at least one image metric is a block-matching transform.

In some embodiments, the block-matching transform includes a block size within a range of 1 to 10 pixels.

In some embodiments, the block-matching transform includes a block search size within a range of 1 to 10 pixels.

In some embodiments, the method further includes registering the probe image and the background image.

In some embodiments, the target signal comprises a fluorescent label bound to a target nucleic acid.

In some embodiments, the target signal comprises a fluorescent label bound to a target peptide or polypeptide.

In some embodiments, imaging the sample with no target to create the background image is performed after imaging the sample with the target to create the probe image.

In some embodiments, imaging the sample with no target to create the background image is performed before contacting the sample with a fluorescent dye to create the probe image.

In some embodiments, imaging the sample comprising no target to create the background image is performed before imaging the sample with the target to create the probe image.

Other aspects and embodiments of the disclosure will be apparent in light of the following detailed description.

DETAILED DESCRIPTION

Figure 1A:
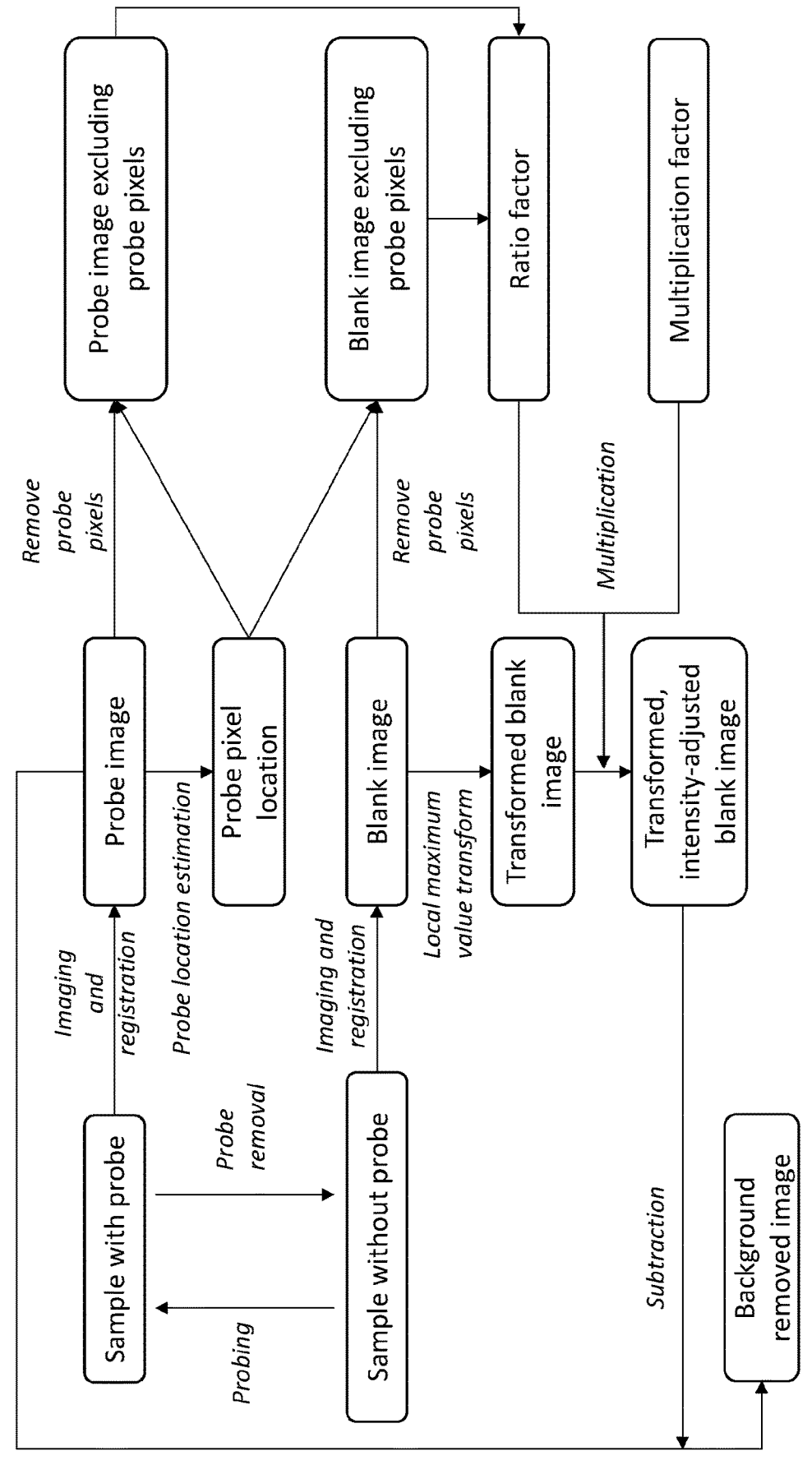
FIGS. 1A-1B: Representative workflow diagrams of the image processing methods to reduce background signals, described with reference to the images being processed (FIG. 1A) and the general steps of the method (FIG. 1B), according to one embodiment of the present disclosure.

Embodiments of the present disclosure provide enhanced methods for signal detection for both in situ hybridization (ISH) and immunocytochemical (ICC)/immunofluorescent (IF) assays in the presence of problematic background autofluorescence. In accordance with these embodiments, methods of the present disclosure include image processing techniques and analyses that utilizes a background image (no target signal) that is acquired approximately in the same region as the image acquired with ISH and/or ICC/IF signals (with target signal). The "blank" image can be obtained either before the fluorescence-based probing process, or after removing the fluorescent dye from the probe (e.g., cleaving a cleavable fluorescent dye from the probe) following the probing process. The various methods described further herein provide a way to subtract a blank image from a probe image to achieve reduction or even complete removal of the background.

The implementation of blank image subtraction methods described further herein can involve accounting for discrepancies in background pixels between a probe image and a blank image, which can contribute to remaining background in the resulting image. Such discrepancies include intensity differences at the same pixel location and mismatches of spatial background patterns. Intensity differences in background between the blank image and the probe image can occur due to various reasons, including (but not limited to) possible differences in the settings of image acquisition and potential photobleaching during fluorophore excitation. In order to compensate for such intensity discrepancies, adjustments are required with respect to the overall background intensity of the probe image vs. the blank image.

To address this, embodiments of the present disclosure include identifying background pixel locations by excluding the probe signals. The probe locations in the probe image are estimated using various methods, including (but not limited to) the use of the White Top Hat algorithm (Gonzalez & Woods, 2008, *DigitalImage Processing*), bandpass filtering (Shenoi, 2006, *Introduction to Digital Signal Processing and Filter Design*), or combinations of these and other methods. Following the estimation of the locations of probe signals, the pixels corresponding to estimated probe locations are excluded from both the probe image and the blank image, resulting in background-pixel-only images. Using this approach, a statistical metric for both of the blank (probe-excluded) and probe (probe-excluded) images are evaluated, and a ratio of the two values of the statistical metric are incorporated in the blank subtraction by multiplying this ratio (calculated as the metric of the probe image divided by the metric of the blank image; "ratio factor") to the blank image before subtraction. The aforementioned statistical metric can be a statistical mean, median, or a combination of both, of all or part of the intensity values in an image. In some embodiments, one means to implement it is to calculate the mean value of the central 80% of the pixel intensity values (excluding the top 10 percentiles and the bottom 10 percentiles).

In addition to using the ratio obtained with the statistical metric that accounts for the global or overall intensity difference between the two images, another multiplication factor is used to compensate for potential local intensity differences. This multiplication factor is further applied to the blank image before subtraction. In some embodiments, the value of this factor ("multiplication factor") can be set to, for example, 1.1 (e.g., allowing 10% of local intensity difference), although this multiplication factor can change based on various factors affecting local intensity differences.

Another potential background fluorescence discrepancy between the probe and blank images is spatial pattern mismatch. Such mismatches can occur due to whole sample movement between different rounds of image acquisition. To account for these discrepancies, image registration techniques can be used, and one example is phase correlation. In some embodiments, previously developed image registration methods can be used that involve the detection and matching of image features to compensate for any global sample movement (e.g., translation and rotation).

Following global image registration, there may be remaining local background pattern mismatches, which may be attributed to, for example, image acquisition at different focal planes, or samples not firmly attached to the supporting material (e.g., glass slides) and partially moving between imaging sessions. To resolve this issue, a method was developed to compensate for such local mismatches. In some embodiments, for each pixel in the blank image ("pixel of interest"), a neighborhood of a pre-defined radius surrounding the pixel of interest is searched. This search process will find the pixel of maximum intensity, and this maximum intensity is assigned to the pixel of interest. This procedure is performed for each pixel, searching its neighborhood in the original blank image, to form a transformed blank image. The transformed blank image is then used instead of the original blank image, to be subtracted from the probe image. The pre-defined radius ("match distance") is adjustable and in most cases it is set in the range of, for example, 0 to 5 pixels, while 0 is used only when there is no noticeable local background pattern mismatch. In practice, the search area can be simplified to only eight angularly equally spaced lines (e.g., 45 degrees apart), each with single-pixel width, radiating from the pixel of interest, to reduce computational time.

The background removal procedure described above is summarized (FIGS. 1A-1B), and the results are illustrated with an ISH assay (e.g., RNAscope® HiPlex assays in FIGS. 2 and 3), which demonstrate that the methods of the present disclosure can effectively reduce background fluorescence (autofluorescence) while maintaining signal of RNA molecules in FFPE tissues.

Section headings as used in this section and the entire disclosure herein are merely for organizational purposes and are not intended to be limiting.

1. DEFINITIONS

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present disclosure. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the present disclosure may be readily combined, without departing from the scope or spirit of the embodiments provided herein. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has." "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising." "consisting of" and "consisting essentially of," the embodiments or elements presented herein, whether explicitly set forth or not.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

"Correlated to" as used herein refers to compared to.

As used herein, the term "in situ hybridization" or "ISH" refers to a technique for localizing and visualizing specific target nucleic acids with the preservation of morphology of the source samples. In some embodiments, "in situ hybridization" comprises fluorescent detection, which is generally referred to as "fluorescent in situ hybridization" (FISH).

Immunocytochemistry (ICC), Immunohistochemistry (IHC) and Immunofluorescence (IF) all utilize antibodies to provide details and characteristics about peptides, polypeptides, and proteins, including but not limited to, abundance, distribution, and localization. As used herein, the term "immunohistochemistry" or "IHC" generally refers to a technique for detecting peptides, polypeptide, and proteins of interest in source samples utilizing antibodies, with the preservation of morphology of the source samples, which is generally tissue samples. As used herein, the term "immunocytochemistry" or "ICC" generally refers to the staining of isolated or cultured intact cells where samples may be from tissue culture cell lines, either adherent or in suspension. Immunofluorescence (IF) refers to fluorescent labeling, thus it is also encompassed in IHC and ICC processes/assays. ICC, IHC, and IF assays can be used in conjunction with the imaging processing methods of the present disclosure, as described further herein, including facilitating quantitative and/or qualitative assessments of a target-of-interest in a sample. ICC, IHC, and IF assays can also be performed in conjunction with an in situ hybridization as part of an integrated co-detection process to detect targets-of-interest, which can also include performing the imaging processing methods of the present disclosure.

The terms "nucleic acid" and "polynucleotide" are used interchangeably herein to describe a polymer of any length composed of nucleotides, e.g., deoxyribonucleotides or ribonucleotides, or compounds produced synthetically, which can hybridize with naturally occurring nucleic acids in a sequence specific manner analogous to that of two naturally occurring nucleic acids, e.g., can participate in Watson-Crick base pairing interactions. As used herein in the context of a polynucleotide sequence, the term "bases" (or "base") is synonymous with "nucleotides" (or "nucleotide"), i.e., the monomer subunit of a polynucleotide. The terms "nucleoside" and "nucleotide" are intended to include those moieties that contain not only the known purine and pyrimidine bases, but also other heterocyclic bases that have been modified. Such modifications include methylated purines or pyrimidines, acylated purines or pyrimidines, alkylated riboses or other heterocycles. In addition, the terms "nucleoside" and "nucleotide" include those moieties that contain not only conventional ribose and deoxyribose sugars, but other sugars as well. Modified nucleosides or nucleotides also include modifications on the sugar moiety, e.g., wherein one or more of the hydroxyl groups are replaced with halogen atoms or aliphatic groups, or are functionalized as ethers, amines, or the like. "Analogues" refer to molecules having structural features that are recognized in the literature as being mimetics, derivatives, having analogous structures, or other like terms, and include, for example, polynucleotides incorporating non-natural nucleotides, nucleotide mimetics such as 2'-modified nucleosides, peptide nucleic acids, oligomeric nucleoside phosphonates, and any polynucleotide that has added substituent groups, such as protecting groups or linking moieties.

The term "probe" as used herein refers to a capture agent that is directed to a specific target mRNA sequence. Accordingly, each probe of a probe set has a respective target mRNA sequence. In some embodiments, the probe provided herein is a "nucleic acid probe" or "oligonucleotide probe" which refers to a nucleic acid capable of binding to a target nucleic acid of complementary sequence, such as the mRNA biomarkers provided herein, usually through complementary base pairing by forming hydrogen bond. As used herein, a probe may include natural (e.g., A, G, C, or T) or modified bases (7-deazaguanosine, inosine, etc.). In addition, the bases in a probe may be joined by a linkage other than a phosphodiester bond, so long as it does not interfere with hybridization. The probes can be directly or indirectly labeled with tags, for example, chromophores, lumiphores, or chromogens. By assaying for the presence or absence of the probe, one can detect the presence or absence of a target mRNA biomarker of interest.

As used herein, a "double-stranded nucleic acid" may be a portion of a nucleic acid, a region of a longer nucleic acid, or an entire nucleic acid. A "double-stranded nucleic acid" may be, e.g., without limitation, a double-stranded DNA, a double-stranded RNA, a double-stranded DNA/RNA hybrid, etc. A "single-stranded nucleic acid" having secondary structure (e.g., base-paired secondary structure) and/or higher order structure comprises a "double-stranded nucleic acid." For example, triplex structures are considered to be "double-stranded." In some embodiments, any base-paired nucleic acid is a "double-stranded nucleic acid."

The term "isolated" when used in relation to a nucleic acid, as in "an isolated oligonucleotide" or "isolated polynucleotide" refers to a nucleic acid sequence that is identified and separated from at least one component or contaminant with which it is ordinarily associated in its natural source. Isolated nucleic acid is such present in a form or setting that is different from that in which it is found in nature. In contrast, non-isolated nucleic acids as nucleic acids such as DNA and RNA found in the state they exist in nature. For example, a given DNA sequence (e.g., a gene) is found on the host cell chromosome in proximity to neighboring genes; RNA sequences, such as a specific mRNA sequence encoding a specific protein, are found in the cell as a mixture with numerous other mRNAs that encode a multitude of proteins. However, isolated nucleic acid encoding a given protein includes, by way of example, such nucleic acid in cells ordinarily expressing the given protein where the nucleic acid is in a chromosomal location different from that of natural cells, or is otherwise flanked by a different nucleic acid sequence than that found in nature. The isolated nucleic acid, oligonucleotide, or polynucleotide may be present in single-stranded or double-stranded form. When an isolated nucleic acid, oligonucleotide or polynucleotide is to be utilized to express a protein, the oligonucleotide or polynucleotide will contain at a minimum the sense or coding strand (i.e., the oligonucleotide or polynucleotide may be single-stranded), but may contain both the sense and anti-sense strands (i.e., the oligonucleotide or polynucleotide may be double-stranded).

As used herein, the term "purified" or "to purify" refers to the removal of components (e.g., contaminants) from a sample. For example, antibodies are purified by removal of contaminating non-immunoglobulin proteins; they are also purified by the removal of immunoglobulin that does not bind to the target molecule. The removal of non-immunoglobulin proteins and/or the removal of immunoglobulins that do not bind to the target molecule results in an increase in the percent of target-reactive immunoglobulins in the sample. In another example, recombinant polypeptides are expressed in bacterial host cells and the polypeptides are purified by the removal of host cell proteins: the percent of recombinant polypeptides is thereby increased in the sample.

The term "gene" refers to a nucleic acid (e.g., DNA) sequence that comprises coding sequences for the production of a polypeptide, precursor, or RNA (e.g., rRNA, tRNA, sRNA, microRNA, lincRNA). The polypeptide can be encoded by a full-length coding sequence or by any portion of the coding sequence so long as the desired activity or functional properties (e.g., enzymatic activity, ligand binding, signal transduction, immunogenicity, etc.) of the full-length or fragment are retained. The term also encompasses the coding region of a structural gene and the sequences located adjacent to the coding region on both the 5' and 3' ends for a distance of about 1 kb or more on either end such that the gene corresponds to the length of the full-length mRNA. Sequences located 5' of the coding region and present on the mRNA are referred to as 5' non-translated sequences. Sequences located 3' or downstream of the coding region and present on the mRNA are referred to as 3' non-translated sequences. The term "gene" encompasses both cDNA and genomic forms of a gene. A genomic form or clone of a gene contains the coding region interrupted with non-coding sequences termed "introns" or "intervening regions" or "intervening sequences." Introns are segments of a gene that are transcribed into nuclear RNA (hnRNA); introns may contain regulatory elements such as enhancers. Introns are removed or "spliced out" from the nuclear or primary transcript; introns therefore are absent in the messenger RNA (mRNA) transcript. The mRNA functions during translation to specify the sequence or order of amino acids in a nascent polypeptide. RNA can be spliced in various ways to produce "alternatively spliced mRNA" transcripts that can encode different polypeptides with different functions. In some aspects, pre-mRNA may be differentially spliced during processing of the pre-mRNA to produce various forms of alternatively spliced RNA, any of which may produce a mature mRNA transcript that encodes a polypeptide. As would be recognized by one of ordinary skill in the art based on the present disclosure, the methods and compositions provided herein can be used to detect any species of alternatively spliced pre-mRNA or mature mRNA transcripts, and differentiate it from other species of alternatively spliced pre-mRNA or mature mRNA transcripts. Additionally, the methods and compositions provided herein can be used to detect any species of alternative pre-mRNA or mature mRNA transcripts that are transcribed from alternatively recombined DNA sequences through DNA recombination mechanisms (e.g., at the TCR loci) or genetic engineering or disease mechanisms, and differentiate these species of alternative pre-mRNA or mature mRNA transcripts from other species of alternative pre-mRNA or mature mRNA transcripts. Additionally, one of skill in the art would recognize that the methods and compositions described herein can be used to detect any target nucleic acid molecule, including different forms of DNA target molecules such as those having DNA rearrangements (e.g., chromosomal rearrangements, e.g., which can give rise to a disease/condition (e.g., muscular dystrophy)), The methods and compositions provided herein can therefore be used to differentiate any nucleic acid target molecule from non-target species based on alternative nucleic acid sequences.

As used herein, the term "heterologous gene" refers to a gene that is not in its natural environment. For example, a heterologous gene includes a gene from one species introduced into another species. A heterologous gene also includes a gene native to an organism that has been altered in some way (e.g., mutated, added in multiple copies, linked to non-native regulatory sequences, etc.). Heterologous genes are distinguished from endogenous genes in that the heterologous gene sequences are typically joined to DNA sequences that are not found naturally associated with the gene sequences in the chromosome or are associated with portions of the chromosome not found in nature (e.g., genes expressed in loci where the gene is not normally expressed).

As used herein, the term "sequence identity" refers to the degree two polymer sequences (e.g., peptide, polypeptide, nucleic acid, etc.) have the same sequential composition of monomer subunits. The term "sequence similarity" refers to the degree with which two polymer sequences (e.g., peptide, polypeptide, nucleic acid, etc.) have similar polymer sequences. For example, similar amino acids are those that share the same biophysical characteristics and can be grouped into the families, e.g., acidic (e.g., aspartate, glutamate), basic (e.g., lysine, arginine, histidine), non-polar (e.g., alanine, valine, leucine, isoleucine, proline, phenylalanine, methionine, tryptophan) and uncharged polar (e.g., glycine, asparagine, glutamine, cysteine, serine, threonine, tyrosine). The "percent sequence identity" (or "percent sequence similarity") is calculated by: (1) comparing two optimally aligned sequences over a window of comparison (e.g., the length of the longer sequence, the length of the shorter sequence, a specified window), (2) determining the number of positions containing identical (or similar) monomers (e.g., same amino acids occurs in both sequences, similar amino acid occurs in both sequences) to yield the number of matched positions, (3) dividing the number of matched positions by the total number of positions in the comparison window (e.g., the length of the longer sequence, the length of the shorter sequence, a specified window), and (4) multiplying the result by 100 to yield the percent sequence identity or percent sequence similarity. For example, if peptides A and B are both 20 amino acids in length and have identical amino acids at all but 1 position, then peptide A and peptide B have 95% sequence identity. If the amino acids at the non-identical position shared the same biophysical characteristics (e.g., both were acidic), then peptide A and peptide B would have 100% sequence similarity. As another example, if peptide C is 20 amino acids in length and peptide D is 15 amino acids in length, and 14 out of 15 amino acids in peptide D arm identical to those of a portion of peptide C, then peptides C and D have 70% sequence identity, but peptide D has 93.3% sequence identity to an optimal comparison window of peptide C. For the purpose of calculating "percent sequence identity" (or "percent sequence similarity") herein, any gaps in aligned sequences are treated as mismatches at that position.

In some embodiments the substitutions can be conservative amino acid substitutions. Examples of conservative amino acid substitutions, unlikely to affect biological activity, include the following: alanine for serine, valine for isoleucine, aspartate for glutamate, threonine for serine, alanine for glycine, alanine for threonine, serine for asparagine, alanine for valine, serine for glycine, tyrosine for phenylalanine, alanine for proline, lysine for arginine, aspartate for asparagine, leucine for isoleucine, leucine for valine, alanine for glutamate, aspartate for glycine, and these changes in the reverse. See e.g., Neurath et al., The Proteins, Academic Press, New York (1979), the relevant portions of which are incorporated herein by reference. Further, an exchange of one amino acid within a group for another amino acid within the same group is a conservative substitution, where the groups are the following: (1) alanine, valine, leucine, isoleucine, methionine, norleucine, and phenylalanine: (2) histidine, arginine, lysine, glutamine, and asparagine: (3) aspartate and glutamate; (4) serine, threonine, alanine, tyrosine, phenylalanine, tryptophan, and cysteine; and (5) glycine, proline, and alanine.

The term "homology" and "homologous" refers to a degree of identity. There may be partial homology or complete homology. A partially homologous sequence is one that is less than 100% identical to another sequence.

As used herein, the terms "complementary" or "complementarity" are used in reference to polynucleotides (e.g., a sequence of nucleotides such as an oligonucleotide or a target nucleic acid) related by the base-pairing rules. For example, for the sequence "5'-A-G-T-3'" is complementary to the sequence "3'-T-C-A-5'." Complementarity may be "partial," in which only some of the nucleic acids' bases are matched according to the base pairing rules. Or, there may be "complete" or "total" complementarity between the nucleic acids. The degree of complementarity between nucleic acid strands has significant effects on the efficiency and strength of hybridization between nucleic acid strands. This is of particular importance in amplification reactions, as well as detection methods that depend upon binding between nucleic acids. Either term may also be used in reference to individual nucleotides, especially within the context of polynucleotides. For example, a particular nucleotide within an oligonucleotide may be noted for its complementarity, or lack thereof, to a nucleotide within another nucleic acid strand, in contrast or comparison to the complementarity between the rest of the oligonucleotide and the nucleic acid strand.

In some contexts, the term "complementarity" and related terms (e.g., "complementary," "complement") refers to the nucleotides of a nucleic acid sequence that can bind to another nucleic acid sequence through hydrogen bonds, e.g., nucleotides that are capable of base pairing, e.g., by Watson-Crick base pairing or other base pairing. Nucleotides that can form base pairs, e.g., that are complementary to one another, are the pairs: cytosine and guanine, thymine and adenine, adenine and uracil, and guanine and uracil. The percentage complementarity need not be calculated over the entire length of a nucleic acid sequence. The percentage of complementarity may be limited to a specific region of which the nucleic acid sequences that are base-paired, e.g., starting from a first base-paired nucleotide and ending at a last base-paired nucleotide. The complement of a nucleic acid sequence as used herein refers to an oligonucleotide which, when aligned with the nucleic acid sequence such that the 5' end of one sequence is paired with the 3' end of the other, is in "antiparallel association." Certain bases not commonly found in natural nucleic acids may be included in the nucleic acids of the present disclosure and include, for example, inosine and 7-deazaguanine. Complementarity need not be perfect; stable duplexes may contain mismatched base pairs or unmatched bases. Those skilled in the art of nucleic acid technology can determine duplex stability empirically considering a number of variables including, for example, the length of the oligonucleotide, base composition and sequence of the oligonucleotide, ionic strength and incidence of mismatched base pairs.

Thus, in some embodiments, "complementary" refers to a first nucleobase sequence that is at least 60%, 65%, 70%, 75%, 80%, 85%, 90%, 95%, 97%, 98%, or 99% identical to the complement of a second nucleobase sequence over a region of 8, 9, 10, 11, 12, 13, 14, 15, 16, 17, 18, 19, 20, 21, 22, 23, 24, 25, 30, 35, 40, 45, 50, 55, 60, 65, 70, 75, 80, 85, 90, 95, 100, or more nucleobases, or that the two sequences hybridize under stringent hybridization conditions. "Fully complementary" means each nucleobase of a first nucleic acid is capable of pairing with each nucleobase at a corresponding position in a second nucleic acid. For example, in certain embodiments, an oligonucleotide wherein each nucleobase has complementarity to a nucleic acid has a nucleobase sequence that is identical to the complement of the nucleic acid over a region of 8, 9, 10, 11, 12, 13, 14, 15, 16, 17, 18, 19, 20, 21, 22, 23, 24, 25, 30, 35, 40, 45, 50, 55, 60, 65, 70, 75, 80, 85, 90, 95, 100, or more nucleobases.

The term "sample" as used herein relates to a material or mixture of materials containing one or more components of interest. The term "sample" includes "biological sample" which refers to a sample obtained from a biological subject, including a sample of biological tissue or fluid origin, obtained, reached, or collected in vivo or in situ. A biological sample also includes samples from a region of a biological subject containing precancerous or cancer cells or tissues. Such samples can be, but are not limited to, organs, tissues, and cells isolated from a mammal. Exemplary biological samples include but are not limited to cell lysate, a cell culture, a cell line, a tissue, oral tissue, gastrointestinal tissue, an organ, an organelle, a biological fluid, a blood sample, a urine sample, a skin sample, and the like. Preferred biological samples include, but are not limited to, whole blood, partially purified blood, PBMC, tissue biopsies, and the like.

As used herein, the term "primary antibody" generally refers to an antibody that binds directly to the antigen of interest. As used herein, the term "secondary antibody" refers to an antibody that is conjugated to a detection label. In some embodiments, the secondary antibody provided herein binds directly to the primary antibody. In other embodiments, the secondary antibody provided herein binds indirectly to the primary antibody (e.g., by binding to another antibody that recognizes the primary antibody).

The terms "detecting" as used herein generally refer to any form of measurement, and include determining whether an element is present or not. This term includes quantitative and/or qualitative determinations.

As used herein, and unless otherwise specified, the terms "treat," "treating," and "treatment" refer to an action that occurs while a patient is suffering from a disease or condition, which reduces the severity of the disease or condition or retards or slows the progression of the disease or condition. In some embodiments, treatment can include preventing a disease or condition from manifesting in a subject. As described further herein, treatment can include altering or maintaining a course of a treatment regimen (e.g., continuing the same treatment regimen, changing one or more aspects of a treatment regimen, ceasing a treatment regimen), for example, based on information obtained by performing the image processing methods of the present disclosure.

The term "network" as used herein generally refers to any suitable electronic network including, but not limited to, a wide area network ("WAN") (e.g., a TCP/IP based network), a local area network ("LAN"), a neighborhood area network ("NAN"), a home area network ("HAN"), or personal area network ("PAN") employing any of a variety of communications protocols, such as Wi-Fi, Bluetooth, ZigBee, etc. In some embodiments, the network is a cellular network, such as, for example, a Global System for Mobile Communications ("GSM") network, a General Packet Radio Service ("GPRS") network, an Evolution-Data Optimized ("EV-DO") network, an Enhanced Data Rates for GSM Evolution ("EDGE") network, a 3GSM network, a 4GSM network, a 5G New Radio, a Digital Enhanced Cordless Telecommunications ("DECT") network, a digital AMPS ("IS-136/TDMA") network, or an Integrated Digital Enhanced Network ("iDEN") network, etc.

The term "computer" as used herein generally includes a plurality of electrical and electronic components that provide power, operational control, and protection to the components and modules within the system. For example, a computer can include, among other things, a processing unit (e.g., a microprocessor, a microcontroller, or other suitable programmable device), a memory, input units, and output units. The processing unit can include, among other things, a control unit, an arithmetic logic unit ("ALC"), and a plurality of registers, and can be implemented using a known computer architecture (e.g., a modified Harvard architecture, a von Neumann architecture, etc.).

The term "memory" as used herein generally refers to any memory storage of the computer and is a non-transitory computer readable medium. The memory can include, for example, a program storage area and the data storage area. The program storage area and the data storage area can include combinations of different types of memory, such as a ROM, a RAM (e.g., DRAM, SDRAM, etc.), EEPROM, flash memory, a hard disk, a SD card, or other suitable magnetic, optical, physical, or electronic memory devices. The processing unit can be connected to the memory and execute software instructions that are capable of being stored in a RAM of the memory (e.g., during execution), a ROM of the memory (e.g., on a generally permanent bases), or another non-transitory computer readable medium such as another memory or a disc. Software included in the implementation of the methods disclosed herein can be stored in the memory. The software includes, for example, firmware, one or more applications, program data, filters, rules, one or more program modules, and other executable instructions. For example, the computer can be configured to retrieve from the memory and execute, among other things, instructions related to the processes and methods described herein.

Preferred methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

2. METHODS OF DETECTION

RNA in situ hybridization (ISH) is a molecular biology technique widely used to measure and localize specific RNA sequences (mRNAs, lncRNAs, and miRNAs) within cells such as circulating tumor cells (CTCs) or tissue sections while preserving the cellular and tissue context. RNA ISH therefore enables spatial-temporal visualization as well as quantification of gene expression within cells and tissues. It has wide applications in research and in diagnostics. RNA ISH signals are dot-like, and each dot represents a single molecular of RNA. Therefore, ISH signals in general are susceptible to tissue autofluorescence. Highly multiplexed ISH assays are also increasingly desirable in the era of multi-omics research, which when combined with effective autofluorescence removal, can be significantly enhanced.

The methods provided herein generally relate to RNA in situ detection of target nucleic acids. Methods for in situ detection of nucleic acids are well known to those skilled in the art (see, for example, US 2008/0038725; US 2009/0081688; Hicks et al., *J Mol. Histol.* 35:595-601 (2004)). As used herein, "in situ hybridization" or "ISH" refers to a type of hybridization that uses a directly or indirectly labeled complementary DNA or RNA strand, such as a probe, to bind to and localize a specific nucleic acid, such as mRNA, in a sample, in particular a portion or section of tissue or cells (in situ). The probe types can be double stranded DNA (dsDNA), single stranded DNA (ssDNA), single stranded complimentary RNA (sscRNA), messenger RNA (mRNA), micro RNA (miRNA), ribosomal RNA, mitochondrial RNA, and/or synthetic oligonucleotides.

In one embodiment, the RNA ISH (RISH) used herein to detect mRNA targets is RNAscope®, which is described in more detail in, e.g., U.S. Pat. Nos. 7,709,198, 8,604,182, and 8,951,726, which are herein incorporated by reference in their entireties. Specifically, RNAscope® describes using specially designed oligonucleotide probes, sometimes referred to as "double-Z" or ZZ probes, in combination with a branched-DNA-like signal amplification system to reliably detect RNA as small as 1 kilobase at single-molecule sensitivity under standard bright-field microscopy (Anderson et al., *J. Cell. Biochem.* 117(10):2201-2208 (2016); Wang et al., *J. Mol. Diagn.* 14(1):22-29 (2012)). Such a probe design greatly improves the specificity of signal amplification because only when both probes in each pair bind to their intended target can signal amplification occur. In another embodiment, the RNA ISH (RISH) used herein to detect mRNA targets is a multiplex assay, such as RNAscope® HiPlex, which is described in more detail in, e.g., International Patent Application Publication No. WO 2020/168162, which is incorporated herein by reference in its entirety. Specifically, RNAscope® HiPlex allows simultaneous detection of up to 12 different RNA targets per slide-mounted sample, enabled by employing cleavable fluorophores and iterative detection.

In one embodiment, the RNA ISH (RISH) used herein to detect mRNA targets is BaseScope®, which is described in more detail in, e.g., US Patent Publication No. 2017/0101672, which is incorporated herein by reference in its entirety. Specifically, BaseScope™ includes the use of specially designed oligonucleotide probes, sometimes referred to as "double-Z" or ZZ probes, in combination with a branched-DNA-like signal amplification system to reliably detect target RNA with single-molecule sensitivity under standard bright-field microscopy. The BaseScope™ platform enables applications such as the detection of exon junctions/splice variants, short/highly homologous RNA sequences (50-300 bases), and point mutations at single cell sensitivity (Anderson, C. M. et al. Visualizing Genetic Variants, Short Targets, and Point Mutations in the Morphological Tissue Context with an RNA In Situ Hybridization Assay. *J. Vis. Exp.* (2018); doi:10.3791/58097). Such a probe design greatly improves the specificity of signal amplification because only when both probes in each pair bind to their intended target can signal amplification occur, enabling the detecting of biological events in cells and in situ using a single Z probe pair.

In another embodiment, the RNA ISH methods of the present disclosure include the use of probes that form stable DNA hairpins, along with a DNA initiator probe. These probes can be used to detect a target mRNA using a hybridization chain reaction (HCR) mechanism. The addition of an initiator strand of DNA to the stable mixture of two hairpin species triggers a chain reaction of hybridization events between the hairpins, which is used to amplify a detectable signal (see, e.g., Dirks, R. M. and Pierce, N. A. Triggered amplification by hybridization chain reaction. *Proc. Natl. Acad. Sc. USA* 101, 15275-15278 (2004)).

Detecting target mRNA(s) generally includes a label probe comprising a detectable label that corresponds to an mRNA molecule. A label is typically used in RNA in situ hybridization for detecting target nucleic acid. As used herein, a "label" is a moiety that facilitates detection of a molecule. Common labels include fluorescent, luminescent, light-scattering, and/or colorimetric labels. Suitable labels include enzymes, and fluorescent and chromogenic moieties, as well as radionuclides, substrates, cofactors, inhibitors, chemiluminescent moieties, magnetic particles, rare earth metals, metal isotopes, and the like. In some embodiments, the label is an enzyme. Exemplary enzyme labels include, but are not limited to Horse Radish Peroxidase (HRP), Alkaline Phosphatase (AP), β-galactosidase, glucose oxidase, and the like, as well as various proteases. Other labels include, but are not limited to, fluorophores, Dinitrophenyl (DNP), and the like. Labels are well known to those skilled in the art, as described, for example, in Hermanson, *Bioconjugate Techniques*, Academic Press, San Diego (1996), and U.S. Pat. Nos. 3,817,837; 3,850,752; 3,939,350; 3,996,345; 4,277,437; 4,275,149; and 4,366,241. Many labels are commercially available and can be used in methods and assays of the present disclosure, including detectable enzyme/substrate combinations (Pierce, Rockford IL; Santa Cruz Biotechnology, Dallas TX; Life Technologies, Carlsbad CA). In one embodiment of the disclosure, the enzyme can utilize a chromogenic or fluorogenic substrate to produce a detectable signal, as described herein.

Any of a number of enzymes or non-enzyme labels can be utilized so long as the enzymatic activity or non-enzyme label, respectively, can be detected. The enzyme thereby produces a detectable signal, which can be utilized to detect a target nucleic acid. In some embodiments, useful detectable signals are chromogenic or fluorogenic signals. Accordingly, enzymes that are suitable for use as a label include those for which a chromogenic or fluorogenic substrate is available. Such chromogenic or fluorogenic substrates can be converted by enzymatic reaction to a readily detectable chromogenic or fluorescent product, which can be readily detected and/or quantified using microscopy or spectroscopy. Such enzymes are well known to those skilled in the art, including but not limited to, horseradish peroxidase, alkaline phosphatase, β-galactosidase, glucose oxidase, and the like (see Hermanson, *Bioconjugate Techniques*, Academic Press, San Diego (1996)). Other enzymes that have well known chromogenic or fluorogenic substrates include various peptidases, where chromogenic or fluorogenic peptide substrates can be utilized to detect proteolytic cleavage reactions. The use of chromogenic and fluorogenic substrates is also well known in bacterial diagnostics, including but not limited to the use of α- and β-galactosidase, β-glucuronidase, 6-phospho-β-D-galactosidase 6-phosphogalactohydrolase, β-glucosidase, α-glucosidase, amylase, neuraminidase, esterases, lipases, and the like (Manafi et al., *Microbiol. Rev.* 55:335-348 (1991)), and such enzymes with known chromogenic or fluorogenic substrates can readily be adapted for use in methods provided herein.

Various chromogenic or fluorogenic substrates to produce detectable signals are well known to those skilled in the art based on the present disclosure and are commercially available. Exemplary substrates that can be utilized to produce a detectable signal include, but are not limited to, 3,3'-di-aminobenzidine (DAB), 3,3',5,5'-tetramethylbenzidine (TMB), Chloronaphthol (4-CN)(4-chloro-1-naphthol), 2,2'-azino-bis(3-ethylbenzothiazoline-6-sulphonic acid) (ABTS), o-phenylenediamine dihydrochloride (OPD), and 3-amino-9-ethylcarbazole (AEC) for horseradish peroxidase: 5-bromo-4-chloro-3-indolyl-1-phosphate (BCIP), nitroblue tetrazolium (NBT), Fast Red (Fast Red TR/AS-MX), and p-Nitrophenyl Phosphate (PNPP) for alkaline phosphatase; 1-Methyl-3-indolyl-β-D-galactopyranoside and 2-Methoxy-4-(2-nitrovinyl)phenyl β-D-galactopyranoside for β-galactosidase; 2-Methoxy-4-(2-nitrovinyl)phenyl β-D-glucopyranoside for β-glucosidase; and the like. Exemplary fluorogenic substrates include, but are not limited to, 4-(Trifluoromethyl)umbelliferyl phosphate for alkaline phosphatase; 4-Methylumbelliferyl phosphate bis (2-amino-2-methyl-1,3-propanediol), 4-Methylumbelliferyl phosphate bis (cyclohexylammonium) and 4-Methylumbelliferyl phosphate for phosphatases; QuantaBlu™ and Quintolet for horseradish peroxidase; 4-Methylumbelliferyl β-D-galacto-pyranoside, Fluorescein di(β-D-galactopyranoside) and Naphthofluorescein di-(β-D-galactopyranoside) for β-galac-tosidase; 3-Acetylumbelliferyl β-D-glucopyranoside and 4-Methylumbelliferyl-β-D-glucopyranoside for β-glucosi-dase; and 4-Methylumbelliferyl-α-D-galactopyranoside for α-galactosidase. Exemplary enzymes and substrates for pro-ducing a detectable signal are also described, for example, in U.S. Patent publication 2012/0100540, which is incorpo-rated herein by reference in its entirety. Various detectable enzyme substrates, including chromogenic or fluorogenic substrates, are well known and commercially available (Pierce, Rockford IL; Santa Cruz Biotechnology, Dallas TX; Invitrogen, Carlsbad CA; 42 Life Science; Biocare). Gen-erally, the substrates are converted to products that form precipitates that are deposited at the site of the target nucleic acid. Other exemplary substrates include, but are not limited to, HRP-Green (42 Life Science), Betazoid DAB, Cardas-sian DAB, Romulin AEC, Bajoran Purple, Vina Green, Deep Space Black™, Warp Red™, Vulcan Fast Red and Ferangi Blue from Biocare (Concord CA; biocare.net/products/de-tection/chromogens).

Exemplary rare earth metals and metal isotopes suitable as a detectable label include, but are not limited to, lantha-nide (III) isotopes such as $^{141}$Pr, $^{142}$Nd, $^{143}$Nd, $^{144}$Nd, $^{145}$Nd, $^{146}$Nd, $^{147}$Sm, $^{148}$Nd, $^{149}$Sm, $^{150}$Nd, $^{151}$Eu, $^{152}$Sm, $^{153}$Eu, $^{154}$Sm, $^{155}$Gd, $^{156}$Gd, $^{158}$Gd, $^{159}$T, $^{160}$Gd, $^{161}$Dy, $^{163}$Dy, $^{163}$Dy, $^{16}$Dy, $^{165}$Ho, $^{166}$Er, $^{167}$Er, $^{168}$Er, $^{169}$Tm, $^{170}$Er, $^{171}$Yb, $^{172}$Yb, $^{173}$Yb, $^{174}$Yb, $^{175}$Lu, and $^{176}$Yb. Metal isotopes can be detected, for example, using time-of-flight mass spec-trometry (TOF-MS)(for example, Fluidigm Helios and Hyperion systems, fluidigm.com/systems; South San Fran-cisco, CA).

Biotin-avidin (or biotin-streptavidin) is a well-known signal amplification system based on the fact that the two molecules have extraordinarily high affinity to each other and that one avidin/streptavidin molecule can bind four biotin molecules. Antibodies are widely used for signal amplification in immunohistochemistry and ISH. Tyramide signal amplification (TSA) is based on the deposition of a large number of haptenized tyramide molecules by peroxi-dase activity. Tyramine is a phenolic compound. In the presence of small amounts of hydrogen peroxide, immobi-lized Horse Radish Peroxidase (HRP) converts the labeled substrate into a short-lived, extremely reactive intermediate. The activated substrate molecules then very rapidly react with and covalently bind to electron-rich moieties of pro-teins, such as tyrosine, at or near the site of the peroxidase binding site. In this way, many hapten molecules conjugated to tyramide can be introduced at the hybridization site in situ. Subsequently, the deposited tyramide-hapten molecules can be visualized directly or indirectly. Such a detection system is described in more detail, for example, in U.S. publication 2012/0100540, which is incorporated herein by reference in its entirety.

Embodiments described herein can utilize enzymes to generate a detectable signal using appropriate chromogenic or fluorogenic substrates. It is understood that, alternatively, a label probe can have a detectable label directly coupled to the nucleic acid portion of the label probe. Exemplary detectable labels are well known to those skilled in the art, including but not limited to chromogenic or fluorescent labels (see Hermanson, *Bioconjugate Techniques*, Academic Press, San Diego (1996)). Exemplary fluorophores useful as labels include, but are not limited to, rhodamine derivatives, for example, tetramethylrhodamine, rhodamine B, rhod-amine 6G, sulforhodamine B, Texas Red (sulforhodamine 101), rhodamine 110, and derivatives thereof such as tetram-ethylrhodamine-5-(or 6), lissamine rhodamine B, and the like; 7-nitrobenz-2-oxa-1,3-diazole (NBD): fluorescein and derivatives thereof: napthalenes such as dansyl (5-dimeth-ylaminonapthalene-1-sulfonyl): coumarin derivatives such as 7-amino-4-methylcoumarin-3-acetic acid (AMCA), 7-di-ethylamino-3-[(4'-(iodoacetyl)amino)phenyl]-4-methylcou-marin (DCIA), Alexa fluor dyes (Molecular Probes), and the like; 4,4-difluoro-4-bora-3a,4a-diaza-s-indacene (BODIPY™) and derivatives thereof (Molecular Probes; Eugene, OR): pyrenes and sulfonated pyrenes such as Cas-cade Blue™ and derivatives thereof, including 8-methoxy-pyrene-1,3,6-trisulfonic acid, and the like; pyridyloxazole derivatives and dapoxyl derivatives (Molecular Probes); Lucifer Yellow (3,6-disulfonate-4-amino-naphthalimide) and derivatives thereof: CyDye™ fluorescent dyes (Amer-sham/GE Healthcare Life Sciences; Piscataway NJ), ATTO 390, DyLight 395XL, ATTO 425, ATTO 465, ATTO 488, ATTO 490LS, ATTO 495, ATTO 514, ATTO 520, ATTO 532, ATTO Rho6G, ATTO 542, ATTO 550, ATTO 565, ATTO Rho3B, ATTO Rho11, ATTO Rho12, ATTO Thio12, ATTO Rho101, ATTO 590, ATTO 594, ATTO Rho13. ATTO 610, ATTO 620, ATTO Rho14, ATTO 633, ATTO 643, ATTO 647, ATTO 647N, ATTO 655, ATTO Oxa12, ATTO 665, ATTO 680, ATTO 700, ATTO 725, ATTO 740, Cyan 500 NHS-Ester (ATTO-TECH, Siegen, Germany), and the like. Exemplary chromophores include, but are not limited to, phenolphthalein, malachite green, nitroaromatics such as nitrophenyl, diazo dyes, dabsyl (4-dimethylaminoazoben-zene-4'-sulfonyl), and the like.

As disclosed herein, the methods provided herein can utilize concurrent detection of multiple target nucleic acids. In the case of using fluorophores as labels, the fluorophores to be used for detection of multiple target nucleic acids are selected so that each of the fluorophores are distinguishable and can be detected concurrently in the fluorescence micro-scope in the case of concurrent detection of target nucleic acids. Such fluorophores are selected to have spectral sepa-ration of the emissions so that distinct labeling of the target nucleic acids can be detected concurrently. Methods of selecting suitable distinguishable fluorophores for use in methods of the disclosure are well known in the art (see, for example, Johnson and Spence, "*Molecular Probes Handbook, a Guide to Fluorescent Probes and labeling Technologies,* 11th ed., Life Technologies (2010)).

Well known methods such as microscopy, cytometry (e.g., mass cytometry, cytometry by time of flight (CyTOF), flow cytometry), or spectroscopy can be utilized to visualize chromogenic, fluorescent, or metal detectable signals associated with the respective target nucleic acids. In general, either chromogenic substrates or fluorogenic substrates, or chromogenic or fluorescent labels, or rare earth metal isotopes, will be utilized for a particular assay, if different labels are used in the same assay, so that a single type of instrument can be used for detection of nucleic acid targets in the same sample.

As disclosed herein, the label can be designed such that the labels are optionally cleavable. As used herein, a cleavable label refers to a label that is attached or conjugated to a label probe so that the label can be removed, for example, in order to use the same label in a subsequent round of labeling and detecting of target nucleic acids. Generally, the labels are conjugated to the label probe by a chemical linker that is cleavable. Methods of conjugating a label to a label probe so that the label is cleavable are well known to those skilled in the art (see, for example, Hermanson, *Bioconjugate Techniques,* Academic Press, San Diego (1996); Daniel et al., *BioTechniques* 24(3):484-489 (1998)). One system of labeling oligonucleotides is the FastTag™ system (Daniel et al., supra, 1998: Vector Laboratories, Burlinghame CA). Various cleavable moieties can be included in the linker so that the label can be cleaved from the label probe. Such cleavable moieties include groups that can be chemically, photo chemically or enzymatically cleaved. Cleavable chemical linkers can include a cleavable chemical moiety, such as disulfides, which can be cleaved by reduction, glycols or diols, which can be cleaved by periodate, diazo bonds, which can be cleaved by dithionite, esters, which can be cleaved by hydroxylamine, sulfones, which can be cleaved by base, and the like (see Hermanson, supra, 1996). One useful cleavable linker is a linker containing a disulfide bond, which can be cleaved by reducing the disulfide bond. In other embodiments, the linker can include a site for cleavage by an enzyme. For example, the linker can contain a proteolytic cleavage site. Generally, such a cleavage site is for a sequence-specific protease. Such proteases include, but are not limited to, human rhinovirus 3C protease (cleavage site LEVLFQ/GP), enterokinase (cleavage site DDDDK/), factor $X_a$ (cleavage site IEGR/), tobacco etch virus protease (cleavage site ENLYFQ/G), and thrombin (cleavage site LVPR/GS) (see, for example, Oxford Genetics, Oxford, UK). Another cleavable moiety can be, for example, uracil-DNA (DNA containing uracil), which can be cleaved by uracil-DNA glycosylase (UNG) (see, for example, Sidorenko et al., *FEBS Lett.* 582(3):410-404 (2008)).

The cleavable labels can be removed by applying an agent, such as a chemical agent or light, to cleave the label and release it from the label probe. As discussed above, useful cleaving agents for chemical cleavage include, but are not limited to, reducing agents, periodate, dithionite, hydroxylamine, base, and the like (see Hermanson, supra, 1996). One useful method for cleaving a linker containing a disulfide bond is the use of tris(2-carboxyethyl)phosphine (TCEP) (see Moffitt et al., *Proc. Natl. Acad Sci. USA* 113:11046-11051 (2016)). In one embodiment, TCEP is used as an agent to cleave a label from a label probe.

For methods of the present disclosure for RNA in situ detection of nucleic acid targets in a cell, the cell is optionally fixed and/or permeabilized before hybridization of the target probes. Fixing and permeabilizing cells can facilitate retaining the nucleic acid targets in the cell and permit the target probes, label probes, and so forth, to enter the cell and reach the target nucleic acid molecule. The cell is optionally washed to remove materials not captured to a nucleic acid target. The cell can be washed after any of various steps, for example, after hybridization of the target probes to the nucleic acid targets to remove unbound target probes, and the like. Methods for fixing and permeabilizing cells for in situ detection of nucleic acids, as well as methods for hybridizing, washing and detecting target nucleic acids, are also well known in the art (see, for example, US 2008/0038725; US 2009/0081688; Hicks et al., *J. Mol. Histol.* 35:595-601 (2004); Stoler, *Clinics in Laboratory Medicine* 10(1):215-236 (1990); *In situ hybridization. A practical approach,* Wilkinson, ed., IRL Press, Oxford (1992); Schwarzacher and Heslop-Harrison, *Practical in situ hybridization,* BIOS Scientific Publishers Ltd, Oxford (2000); Shapiro, *Practical Flow Cytometry* 3rd ed., Wiley-Liss, New York (1995); Ormerod, *Flow Cytometry,* 2nd ed., Springer (1999)). Exemplary fixing agents include, but are not limited to, aldehydes (formaldehyde, glutaraldehyde, and the like), acetone, alcohols (methanol, ethanol, and the like). Exemplary permeabilizing agents include, but are not limited to, alcohols (methanol, ethanol, and the like), acids (glacial acetic acid, and the like), detergents (Triton, NP-40, Tween™ 20, and the like), saponin, digitonin, Leucoperm™ (BioRad, Hercules, CA), and enzymes (for example, lysozyme, lipases, proteases and peptidases). Permeabilization can also occur by mechanical disruption, such as in tissue slices.

RNA in situ detection methods can be used on tissue specimens immobilized on a glass slide, on single cells in suspension. Tissue specimens include, for example, tissue biopsy samples. Blood samples include, for example, blood samples taken for diagnostic purposes. In the case of a blood sample, the blood can be directly analyzed, such as in a blood smear, or the blood can be processed, for example, lysis of red blood cells, isolation of PBMCs or leukocytes, isolation of target cells, and the like, such that the cells in the sample analyzed by methods of the disclosure are in a blood sample or are derived from a blood sample. Similarly, a tissue specimen can be processed, for example, the tissue specimen minced and treated physically or enzymatically to disrupt the tissue into individual cells or cell clusters. Additionally, a cytological sample can be processed to isolate cells or disrupt cell clusters, if desired. Thus, the tissue, blood and cytological samples can be obtained and processed using methods well known in the art. The methods of the disclosure can be used in diagnostic applications to identify the presence or absence of pathological cells based on the presence or absence of a nucleic acid target that is a biomarker indicative of a pathology.

It is understood by those skilled in the art based on the present disclosure that any of a number of suitable samples can be used for detecting target nucleic acids using methods provided herein. The sample for use in methods provided herein will generally be a biological sample or tissue sample. Such a sample can be obtained from a biological subject, including a sample of biological tissue or fluid origin that is collected from an individual or some other source of biological material such as biopsy, autopsy or forensic materials. A biological sample also includes samples from a region of a biological subject containing or suspected of containing precancerous or cancer cells or tissues, for example, a tissue biopsy, including fine needle aspirates, blood sample or cytological specimen. Such samples can be, but are not limited to, organs, tissues, tissue fractions and/or cells isolated from an organism such as a mammal. Exemplary biological samples include, but are not limited to, a cell culture, including a primary cell culture, a cell line, a tissue, an organ, an organelle, a biological fluid, and the like. Additional biological samples include but are not limited to a skin sample, tissue biopsies, including fine needle aspirates, cytological samples, stool, bodily fluids, including blood and/or serum samples, saliva, semen, and the like. Such samples can be used for medical or veterinary diagnostic purposes.

Collection of cytological samples for analysis by methods provided herein are well known in the art (see, for example, Dey, "Cytology Sample Procurement, Fixation and Processing" in *Basic and Advanced Laboratory Techniques in Histopathology and Cytology* pp. 121-132, Springer, Singapore (2018); "Non-Gynecological Cytology Practice Guideline" American Society of Cytopathology, Adopted by the ASC executive board Mar. 2, 2004). For example, methods for processing samples for analysis of cervical tissue, including tissue biopsy and cytology samples, are well known in the art (see, for example, *Cecil Textbook of Medicine*, Bennett and Plum, eds., 20th ed., WB Saunders, Philadelphia (1996); *Colposcopy and Treatment of Cervical Introepithelial Neoplasia: A Beginner's Manual*, Sellors and Sankaranarayanan, eds., International Agency for Research on Cancer, Lyon, France (2003); Kalaf and Cooper, *J. Clin. Pathol.* 60:449-455 (2007); Brown and Trimble, *Best Pract. Res. Clin. Obstet. Gynaecol.* 26:233-242 (2012); Waxman et al., *Obstet. Gynecol.* 120:1465-1471 (2012): *Cervical Cytology Practice Guidelines TOC*. Approved by the American Society of Cytopathology (ASC) Executive Board, Nov. 10, 2000)).

In some embodiments, the sample is a tissue specimen or is derived from a tissue specimen. In some embodiments, the tissue specimen is formalin-fixed paraffin-embedded (FFPE). In some embodiments, the tissue specimen is fresh frozen. In some embodiments, the tissue specimen is prepared with a fixative other than formalin. In some embodiments, the fixative other than formalin is selected from the group consisting of ethanol, methanol, Bouin's, B5, and I.B.F. In still other embodiments, the sample is a cytological sample or is derived from a cytological sample.

Embodiments of the present disclosure also include the ability to measure and/or quantify a detectable label using the image processing methods described herein. In some embodiments, the label is detected using a single-plex format, and in other embodiments, the label is detected in a duplex or multiplex format, which facilitates the detection and/or quantification of more than one target mRNA. In accordance with these embodiments, the methods and compositions described herein include the use of detection/quantification systems, such as the use of computer software and hardware. In one embodiment, a detection/quantification system of the present disclosure includes a computer and suitable software for receiving user instructions, either in the form of user input into a set of parameter fields (e.g., in a GUI, or in the form of preprogrammed instructions, which can be preprogrammed for a variety of different specific operations to assess a sample). For example, the software can be preprogrammed for one or more operation such as sample handling, slide handling, de-paraffinization, de-crosslinking, hybridization, washing, and the like, as described herein. The software can convert these instructions to appropriate language for controlling the operation of components of the system (e.g., for controlling a fluid handling element and/or laser). The computer can also receive data from other components of the system (e.g., from a detector), and can interpret and/or process the data, provide it to a user in a readable format, or use that data to initiate further operations, in accordance with any programming by the user. In this manner, the system can, for example, quantify any number of detectable labels, compare them to each other (e.g., in a multiplex format) or to controls (e.g., a reference control), and generate a value corresponding to the amount of mRNA in the sample. Any appropriate computer software can be used to facilitate quantitation/detection of a label, including but not limited to, ImageJ, QuPath, and other commercial software such as HALO and Visiopharm.

In some embodiments, the methods of the present disclosure include detecting and/or quantifying mRNA levels and/or levels of a protein in a sample from a subject suspected of having a disease or condition, and compare those levels to a reference control (e.g., a healthy control sample) in order to determine whether the amount of a given target (e.g., mRNA(s) and/or protein(s) with respect to control levels supports a diagnosis that the subject has that disease or condition. In some embodiments, target mRNAs and proteins can be compared to each other to determine whether a subject has a disease or condition. In some embodiments, the methods include means for determining proportions or ratios of mRNA and/or protein target levels with respect to each other and to controls. As would be recognized by one of ordinary skill in the art based on the present disclosure, reference levels or reference controls can be obtained from various sources, including but not limited to, databases of mRNA and/or levels, patient look-up tables, and/or directly from patient samples; which source is used for a given assessment depends on various factors, such as the mRNA and/or protein target(s) being evaluated, the disease context, the cell/tissue type, and the like.

In some embodiments, the methods of the present disclosure enable a user (e.g., medical processional such as a pathologist) to view a sample from a subject and compare it to a reference control (from the same subject or a different subject (e.g., healthy control sample). In accordance with these embodiments, the methods enables a user to make a determination as to whether a target (e.g., mRNA and/or protein) is present in sufficient amounts to warrant a diagnosis that the subject has or is likely to develop a disease condition. The methods can also provide means for assessing spatial patterns of target mRNA/protein expression and/or determine whether a target mRNA/protein is more or less abundant in a spatially-restricted area of a sample that may correspond to a meaningful anatomical feature (e.g., a tumor micro-environment).

In some embodiments, the image processing methods of the present disclosure can be performed in conjunction with the simultaneously detection of a target nucleic acid and a target protein, peptide, or polypeptide in a sample. In general, the method can include incubating a biological sample with a primary antibody, treating the biological sample with a crosslinking agent, and detecting the target nucleic acid by in situ hybridization. In some embodiments, the method further comprises treating the biological sample with a protease after treating the biological sample with the crosslinking agent and before detecting the target nucleic acid by in situ hybridization. In other embodiments, the method further includes incubating the biological sample with a secondary antibody or other labeling methods after detecting the target nucleic acid by in situ hybridization. In some embodiments, the preparation methods include performing the following steps sequentially: incubating the biological sample with a primary antibody; treating the biological sample with a crosslinking agent; treating the biological sample with a protease; detecting the target nucleic acid by ISH; and incubating the biological sample with a secondary antibody or other labeling methods to detect a peptide, polypeptide, or protein of interest (e.g., using ICC, IHC, and IF). In some embodiments, additional steps may be included.

Like ISH in that temporal and spatial information can be preserved, IHC/ICC is another widely used technique, but for detecting target proteins. Taking advantage of specificity of antigen-antibody binding, IHC facilitates the visualization of the high-resolution distribution and localization of specific target proteins within cells and within their proper histological context. In some embodiments, IHC/ICC comprises preparing a whole-cell preparation, a paraffin-embedded tissue, a frozen tissue, or a floating section. If it is a paraffin-embedded tissue that is prepared, the next step for IHC is de-paraffinization, which is to remove paraffin. During the tissue preparation and preservation process, if a crosslinking agent, such as formalin, is used, formalin fixation may mask epitopes and result in decreased immunoreactivity (see Arnold et al., Biotech Histochem 71:224-230(1996)). Formalin fixation is a time-dependent process in which increased fixation time results in continued formaldehyde group binding to proteins to a point of equilibrium (see Fox et al., J Histochem Cytochem 33:845-853 (1985)). Studies have shown that formalin fixation, especially if prolonged, results in decreased antigenicity (see Battifora and Kopinski, J Histochem Cytochem 34:1095-1100 (1986)), which limits the use of formalin-fixed tissues for diagnostic IHC (see Ramos-Vara, Vet Pathol 42:405-426 (2005), Webster et al., J Histochem Cytochem. 57(8): 753-761(2009)).

The benefits of simultaneously detecting a target nucleic acid using ISH and a target protein using IHC/ICC can be critical assessing a biological sample and/or making a treatment or diagnostic decision. For example, simultaneously detecting a target nucleic acid using ISH and a target protein using IHC/ICC increases the throughput of analysis and reduces the burden of time and cost associated with the investigation of those individual components. Furthermore, combined detection in the same sample offers researchers and medical professionals information which cannot be gained from staining on separate sections, such as, visualizing both a secreted protein and the origin of its cell(s), and interaction of distinct cell types. Though the steps in both techniques described above appear similar, it has been problematic to apply the two techniques to one sample, and accurately imaging the results of these assays has been even more challenging. Thus, as described further below, the image processing methods of the present disclosure facilitate the robust acquisition of qualitative and quantitative information of various targets-of-interest detected simultaneously in a biological sample using in situ hybridization and IHC/ICC.

3. IMAGE PROCESSING

Figure 1B:
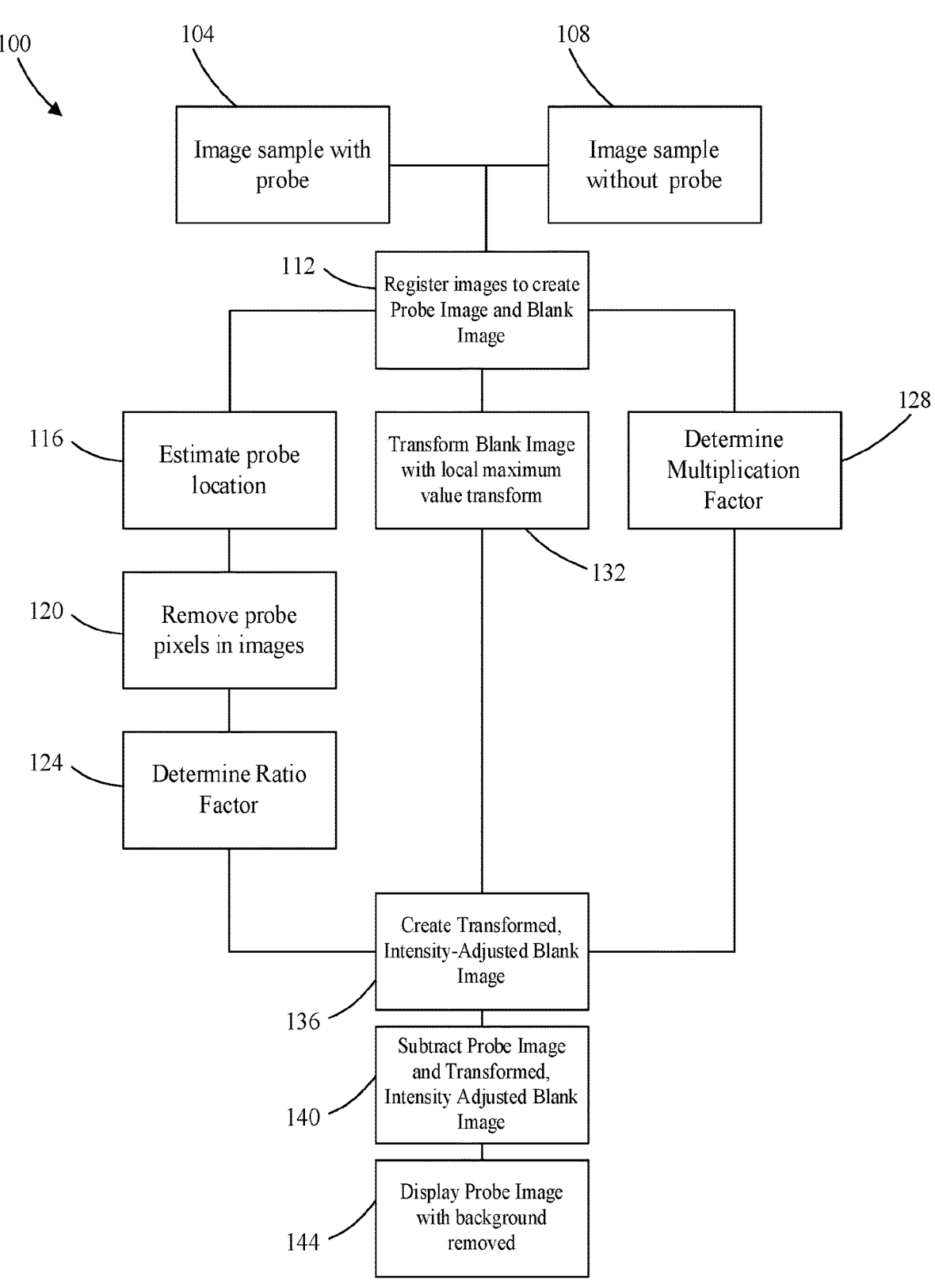

Embodiments of the present disclosure include a method 100 for enhancing detection of a target. In some embodiments, the method 100 includes an image processing method. The method 100 is illustrated in FIG. 1B as a flowchart of steps, whereas FIG. 1A illustrates a plurality of images and corresponding factors used in the method 100 to modify the images. In the illustrated embodiment, the method 100 is implemented at least in part with a computer having corresponding instructions stored on a memory (i.e., a non-transitory computer readable medium). The final images, and in some embodiments the intermediate images, from the method 100 are stored in a memory. In some embodiments, the memory is accessible by a network. In some embodiments, user input or instructions are receivable or accessible over the network.

The method 100 includes imaging a sample with a target signal (STEP 104) to create a probe image and imaging a sample with no target signal (STEP 108) to create a background image (i.e. "blank image"). In some embodiments, the imaging utilizes a fluorescent microscope coupled to a computer via a network. In some embodiments, the target signal is obtained by subjecting the sample to a fluorescent in situ hybridization assay and/or an immunofluorescence assay. In some embodiments, the background image with no target signal is obtained by removing the target signal from the sample (i.e., by a cleaving process). In other embodiments, the background image with no target signal is obtained before the assay is performed. In other words, in some embodiments STEP 104 occurs before STEP 108 and in other embodiments STEP 104 occurs after STEP 108. In some embodiments, the target signal comprises a fluorescent label bound to a target nucleic acid. In other embodiments, the target signal comprises a fluorescent label bound to a target peptide or polypeptide.

With continued reference to FIG. 1B, the method 100 includes a STEP 112 of registering the probe image and the background image. Potential background fluorescence discrepancy between the probe image and the background image create spatial pattern mismatches that occur due to whole sample movement between different rounds of image acquisition. To remove such discrepancies, image registration techniques (e.g., phase correlation) are utilized. Robust image registration (e.g., STEP 112) utilized detection and matching of image features to compensate for any global sample movement (i.e., translation and rotation).

The method 100 further includes modifying the background image (STEP 136) to create an adjusted background image (e.g., transformed, intensity-adjusted blank image) based on at least one image metric. As explained further herein, the at least one image metric is a ratio factor (STEPS 116, 120, 124), a multiplication factor (STEP 128), a local maximum value transform (STEP 132), and any other suitable metric. In some embodiments, the method 100 includes a single image metric. In other embodiments, the method 100 includes a combination of image metrics.

With continued reference to FIG. 1B, the method 100 further includes subtracting the adjusted background image from the probe image (STEP 140) to create a final image comprising an enhanced target signal. In other words, the modified (i.e. transformed, adjusted, scaled, etc.) blank image is used in the subtracting step (STEP 140) instead of the original blank image. In some embodiments, the enhanced target signal includes enhanced contrast. In some embodiments, the method 100 includes displaying the final image (STEP 144) on a display (e.g., a computer display). The final image may be saved to a memory and may be accessible by a user, for example, over a network. As such, the method 100 provides improved signal detection in the presence of a background with tissue autofluorescence.

In some embodiments, the image metric is a ratio factor to account for intensity differences in background between the blank image and the probe image. Intensity differences can occur when image acquisition settings are different or from photobleaching during fluorophore excitation. To compensate for background intensity differences, the method 100 includes STEPS 116, 120, and 124 to determine a ratio factor that compares the overall background intensity of the probe image versus the blank image. First, the pixel locations of the probe are estimated (STEP 116). The probe locations in the probe image are estimated using, for example, the White Top Hat algorithm (Gonzalez & Woods, 2008, *Digital Image Processing*), bandpass filtering (Shenoi, 2006, *Introduction to Digital Signal Processing and Filter Design*), or any combination of suitable methods. After determining an estimated location of the target signals in the probe image (STEP 116), the pixels at the estimated probe locations are excluded from both the probe image and the blank image (STEP 120), resulting in background-pixel-only images (i.e. background-only images). In other words, STEP 120 includes removing the estimated location from the probe image to create a first background-only image and removing the estimated location from the blank image (background image) to create a second background-only image.

Following removal of the estimated probe locations from both images (STEP 120), the method 100 includes a STEP 124 to determine a ratio factor. In other words, a statistical metric for both the probe-excluded blank image and the probe-excluded probe image is evaluated and incorporated into a ratio factor. As explained further herein, the ratio factor is utilized in some embodiments to modify the background image to create an adjusted background image (STEP 136). In other words, modifying the background image to create an adjusted background image can include, in some embodiments, scaling the background image by the ratio factor.

In some embodiments, the at least one image metric is a ratio factor of the first background-only image and the second background-only image. For example, the ratio factor in some embodiments is a first intensity to a second intensity, with the first intensity is determined from the first background-only image and the second intensity is determined from the second background-only image. In some embodiments, the first and second intensities used in the ratio factor are statistical metrics such as a statistical mean, median, or a combination of both for any portion of (including all) the intensity values in an image.

In some embodiments, the first intensity is the mean of a plurality of pixel intensity values in the first background-only image and the second intensity is the mean of a plurality of pixel intensity values in the second background-only image. In some embodiments, the mean is of all the pixel intensity values in the image. In other embodiments, the first intensity is the median of a plurality of pixel intensity values in the first background-only image, and the second intensity is the median of a plurality of pixel intensity values in the second background-only image. In some embodiments, the median is of all the pixel intensity values in the image. In another embodiment, the first intensity is the mean of a central approximately 80% of all the pixel intensity values (i.e. excluding the approximate top 10% and the approximate bottom 10%) in the first background-only image, and the second intensity is the mean of a central approximately 80% of all the pixel intensity values in the second background-only image.

In some embodiments, the image metric is a multiplication factor to account for potential local intensity differences between the blank image and the probe image. In particular, the method 100 in the illustrated embodiment includes STEP

128 to determine the multiplication factor. In some embodiments, the multiplication factor is within a range of approximately 1.0 to approximately 1.2. In other embodiments, the multiplication factor is within a range of approximately 1.0 to approximately 1.1. As explained further herein, the multiplication factor is utilized in some embodiments to modify the background image to create an adjusted background image (STEP 136). In other words, modifying the background image to create an adjusted background image can include, in some embodiments, scaling the background image by the multiplication factor.

In some embodiments, the image metric is a local maximum value transform. In particular, the method 100 in the illustrated embodiment includes STEP 132 to transform the blank image with a local maximum value transform. Even after global image registration, there may remain local background pattern mismatches that from, for example, image acquisition at different focal planes, or samples not firmly attached to the supporting material (e.g., glass slides) and partially moving between imaging sessions. To resolve this issue, local mismatches are compensated with a transform. In the illustrated embodiment, for each pixel in the blank image ("pixel of interest"), a neighborhood of a pre-defined radius surrounding the pixel of interest is searched. The search process will find the pixel of maximum intensity, and this maximum intensity is assigned to that pixel of interest. This searching procedure is performed for each pixel of interest, searching its neighborhood in the original blank image, to form a transformed blank image. As explained in greater detail herein, the transformed blank image can be used instead of the original blank image in the later subtracting step (i.e. STEP 140). In some embodiments, the pre-defined radius ("match distance") is adjustable.

In some embodiments, the pre-defined radius used in the local maximum valve transform is within a range of approximately 0 to approximately 5 pixels. In other words, the local maximum value transform includes a search radius within a range of approximately 0 to 5 pixels. A pre-defined radius of 0 pixels is utilized, for example, when there is no noticeable local background pattern mismatch. In some embodiments, the search area is simplified to reduce computational time by using eight angularly equally spaced lines (i.e. 45 degrees apart), each with a single-pixel width, radiating from the pixel of interest.

In some embodiments, the image metric is a block-matching transform. In particular, the method 100, in some embodiments, includes a step to transform the blank image with a block-matching transform. In some embodiments, the block-matching transform is used in place of the local maximum value transform to resolve the issue of local mismatches. In some embodiments, a block ("block of interest") is used with a pre-defined block size (e.g., a 3-pixel-by-3-pixel block). Each block in the blank image is compared with blocks of the same size in the probe image in nearby locations (i.e., within a pre-defined block search size). The search determines the nearby block that is most similar to the block of interest. A similarity metric is utilized to measure the similarity of the blocks, and the searched nearby block with the highest similarity metric is determined to be the target block. Then, the block of interest is moved to the corresponding location of the target block. In some embodiments, the similarity metric is a mean absolute difference, a sum of absolute difference, a mean squared difference, or a sum of squared difference, wherein the differences are the pixel intensity differences between the two blocks being compared. As such, the block-matching transform is performed for each block of interest, searching its corresponding neighborhood in the probe image and moving its location accordingly, to form a transformed blank image. In some embodiments, this transformed blank image is used instead of the original blank image in later subtracting steps (i.e., STEP 140).

In some embodiments, the pre-defined block size and the pre-defined block search size are adjustable. In some embodiments, the pre-defined block size used in the block-matching transform is within a range of approximately 1 to approximately 10 pixels. In other words, the block-matching transform includes a block size within a range of approximately 1 to 10 pixels. In some embodiments, the pre-defined block search size used in the block matching transform is within a range of approximately 1 to approximately 10 pixels. In other words, the block-matching transform includes a block search size within a range of approximately 1 to 10 pixels.

In some embodiments, the method for enhancing detection of a target includes any combination of the steps described herein, in various orders. In some embodiments, steps may be omitted. Further, the order of the steps may be reversed, altered, or performed simultaneously.

In at least one embodiment, the electronic-based aspects of the method 100 may be implemented in software (e.g., stored on non-transitory computer-readable medium) executable by a computer with one or more processing units, such as a microprocessor and/or application specific integrated circuits ("ASICs"). Some embodiments may include hardware, software, and electronic components or modules. As such, it should be noted that a plurality of hardware and software-based devices, as well as a plurality of different structural components, may be utilized to implement the embodiments.

4. KITS

Embodiments of the present disclosure also include a kit or system for detecting and/or quantifying an mRNA target and/or a protein target in a biological sample. In some embodiments, the kit or system includes instructions (e.g., software) for performing the image processing methods of the present disclosure. In one embodiment, the kit includes agents for performing RNAscope® as described in more detail in, e.g., U.S. Pat. Nos. 7,709,198, 8,604,182, and 8,951,726, which are herein incorporated by reference in their entireties. In another embodiment, the kit includes agents for performing BaseScope™, which is described in more detail in, e.g., U.S. patent application Ser. No. 13/575,936, and PCT Appln. No. PCT/US2011/023126, which are incorporated herein by reference in their entireties.

In some embodiments, the kit includes other agents or materials for performing RNA in situ hybridization or hybridization chain reaction assays, including but not limited to, fixing agents and agents for treating samples for preparing hybridization, agents for washing samples, and the like. In some embodiments, the kit includes at least one of a hybridization buffer, dextran sulfate, formamide, dithiothreitol (DDT), sodium chloride and sodium citrate (SSC), EDTA, Denhardt's solution, a fluorescent label, a chromogenic label, dNTPs, single-stranded DNA, tRNA, polyA, an initiator oligo, or any combination thereof. In some embodiments, the kit includes one or more reagents for performing an immunofluorescence (IF) assay (e.g., an ICC or IHC assay).

The kits of the present disclosure may further include instructions and/or packaging material, which generally includes to a physical container for housing and/or delivering the components of the kit. The packaging material can maintain the components sterilely, and can be made of material commonly used for such purposes (e.g., paper, corrugated fiber, glass, plastic, foil, ampules, vials, tubes, etc.).

Kits provided herein can include labels or inserts, such as instructions for performing an assay (e.g., FISH or IF assay). Labels or inserts include information on a condition, disorder, disease, or symptom for which the kit component may be used. Labels or inserts can include instructions for a clinician or for a subject to use one or more of the kit components in a method, treatment protocol, or therapeutic regimen. In some embodiments, labels or inserts include information on cancers for which the kit component may be used for, such as colorectal cancer (CRC), papillary thyroid cancer (PTC), non-small-cell lung carcinoma (NSCLC), sarcoma, pediatric glioma, breast cancer, gallbladder, cholangiocarcinoma, spitzoid melanoma, astrocytoma, glioblastoma (GBM), pancreatic cancer, uterus carcinoma, pilocytic astrocytoma, pediatric glioma, head and neck squamous cell carcinoma (HNSCC), glioma, salivary gland tumor (including acinic cell carcinoma), adult acute myeloid leukemia (AML), nephroma, and inflammatory myofibroblastic tumor (IMT), breast secretory carcinoma, infantile (congenital) fibrosarcoma, mammary analogue secretory carcinoma of salivary glands, congenital mesoblastic nephroma, spitz tumors, intrahepatic cholangiocarcinoma, appendiceal adenocarcinoma, pediatric DIPG and non-brainstem high-grade glioma, uterine sarcoma, thyroid carcinoma, sarcoma (NOS), GIST, lung adenocarcinoma, ph-like acute lymphoblastic leukemia, colon adenocarcinoma, brain low-grade glioma, or breast invasive carcinoma. In some embodiments, labels or inserts include information on cancers for which the kit component may be used for, such as mesothelioma, bladder cancer, pancreatic cancer, skin cancer, cancer of the head or neck, cutaneous or intraocular melanoma, ovarian cancer, breast cancer, uterine cancer, carcinoma of the fallopian tubes, carcinoma of the endometrium, carcinoma of the cervix, carcinoma of the vagina, carcinoma of the vulva, bone cancer, colon cancer, rectal cancer, cancer of the anal region, stomach cancer, gastrointestinal (gastric, colorectal and/or duodenal) cancer, chronic lymphocytic leukemia, acute lymphocytic leukemia, esophageal cancer, cancer of the small intestine, cancer of the endocrine system, cancer of the thyroid gland, cancer of the parathyroid gland, cancer of the adrenal gland, sarcoma of soft tissue, cancer of the urethra, cancer of the penis, testicular cancer, hepatocellular (hepatic and/or biliary duct) cancer, primary or secondary central nervous system tumor, primary or secondary brain tumor, Hodgkin's disease, chronic or acute leukemia, chronic myeloid leukemia, lymphocytic lymphoma, lymphoblastic leukemia, follicular lymphoma, lymphoid malignancies of T-cell or B-cell origin, melanoma, multiple myeloma, oral cancer, non-small-cell lung cancer, prostate cancer, small-cell lung cancer, cancer of the kidney and/or ureter, renal cell carcinoma, carcinoma of the renal pelvis, neoplasms of the central nervous system, primary central nervous system lymphoma, non-Hodgkin's lymphoma, spinal axis tumors, brain stem glioma, pituitary adenoma, adrenocortical cancer, gall bladder cancer, cancer of the spleen, cholangiocarcinoma, fibrosarcoma, neuroblastoma, retinoblastoma or a combination thereof.

In some embodiments, labels or inserts include information on cancers for which the kit component may be used for a hematological cancer, such as Hodgkin's lymphoma, non-Hodgkin's lymphoma (NHL), cutaneous B-cell lymphoma, activated B-cell lymphoma, diffuse large B-cell lymphoma (DLBCL), mantle cell lymphoma (MCL), follicular center lymphoma, transformed lymphoma, lymphocytic lymphoma of intermediate differentiation, intermediate lymphocytic lymphoma (ILL), diffuse poorly differentiated lymphocytic lymphoma (PDL), centrocytic lymphoma, diffuse small-cleaved cell lymphoma (DSCCL), peripheral T-cell lymphomas (PTCL), cutaneous T-Cell lymphoma, mantle zone lymphoma, low grade follicular lymphoma, multiple myeloma (MM), chronic lymphocytic leukemia (CLL), diffuse large B-cell lymphoma (DLBCL), myelodysplastic syndrome (MDS), acute T cell leukemia, acute myeloid leukemia (AML), acute promyelocytic leukemia, acute myeloblastic leukemia, acute megakaryoblastic leukemia, precursor B acute lymphoblastic leukemia, precursor T acute lymphoblastic leukemia, Burkitt's leukemia (Burkitt's lymphoma), acute biphenotypic leukemia, chronic myeloid lymphoma, chronic myelogenous leukemia (CML), and chronic monocytic leukemia. In some embodiments, the labels or inserts include instructions for a clinician, pathologist, or other medical professional to interpret data produced by the reagents from the kits and compositions described herein on a subject, including whether and when to employ other detection technology, and subsequently to make a decision on whether to administer a treatment to the subject.

Labels or inserts can include "printed matter," e.g., paper or cardboard, separate or affixed to a component, a kit or packing material (e.g., a box), or attached to, for example, an ampule, tube or vial containing a kit component. Labels or inserts can additionally include a non-transitory computer readable medium, such as a disk (e.g., hard disk, card, and memory disk), optical disk such as CD- or DVD-ROM/RAM, DVD, MP3, magnetic tape, RAM, ROM hybrids of these such as magnetic/optical storage media. FLASH media, or memory type cards. Labels or inserts can include information identifying manufacturer information, lot numbers, manufacturer location, and date. In some embodiments, the kit provided herein is for determination if a subject has cancer or is likely to develop a disease or disorder.

5. EXAMPLES

It will be readily apparent to those skilled in the art that other suitable modifications and adaptations of the methods of the present disclosure described herein are readily applicable and appreciable, and may be made using suitable equivalents without departing from the scope of the present disclosure or the aspects and embodiments disclosed herein. Having now described the present disclosure in detail, the same will be more clearly understood by reference to the following examples, which are merely intended only to illustrate some aspects and embodiments of the disclosure, and should not be viewed as limiting to the scope of the disclosure. The disclosures of all journal references, U.S. patents, and publications referred to herein are hereby incorporated by reference in their entireties.

The present disclosure has multiple aspects, illustrated by the following non-limiting examples.

Example 1

FIGS. 1A-1B include representative workflow diagrams of the image processing methods that reduce background signals of the present disclosure. FIG. 1A describes the method with reference to the images being processed, while FIG. 1B describes the general steps of the method. As shown in FIG. 1A, the exemplary workflow begins with a sample that has been subject to an assay (e.g., ISH and/or ICC assay) to detect a target signal corresponding to a target analyte (e.g., mRNA or polypeptide). Images are obtained from a sample with the target probe and from the sample without the target probe (e.g., by removing the target probe from the sample). The method then includes imaging approximately the same region of interest (ROI), for example, using fluorescent microscopy and associated hardware/software to obtain and process fluorescent images, and performing image registration to produce a "probe image" and "blank image." The method then includes estimating the "probe pixel location" using the probe image, and then the pixels in the corresponding location are removed from both the probe image and the blank image to determine a "ratio factor." The "blank image" is then transformed by assigning a local maximum value to each pixel, followed by intensity adjustment using the "ratio factor" and the "multiplication factor." The "transformed, intensity adjusted blank image" is then subtracted from the original probe image to produce the final "background removed image." FIG. 1B outlines a similar workflow based on the step described above.

Example 2

Figure 2:
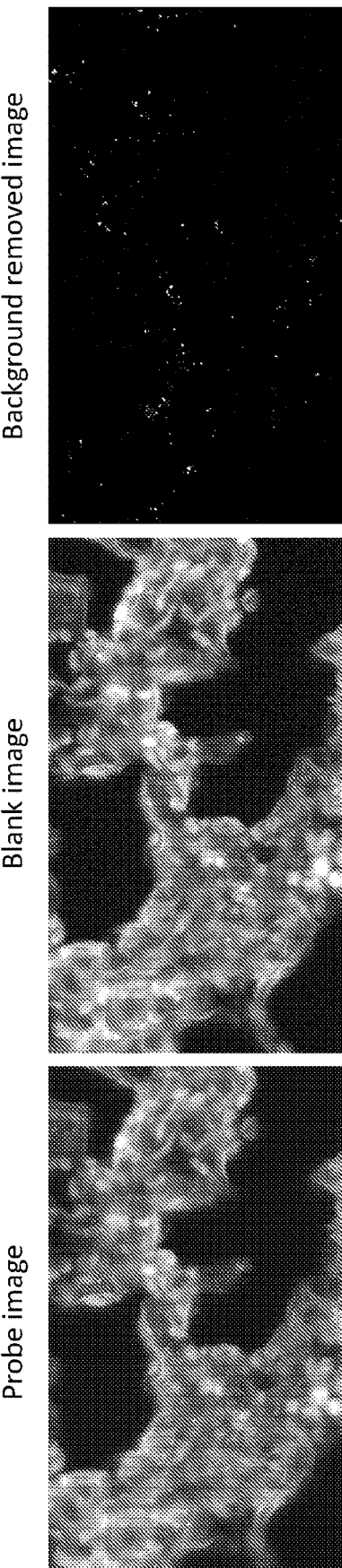
FIG. 2: Representative images of results demonstrating removal of background signals from samples of mouse lung tissue subjected to ISH (RNAscope® HiPlex assay), according to one embodiment of the present disclosure.
Figure 3:
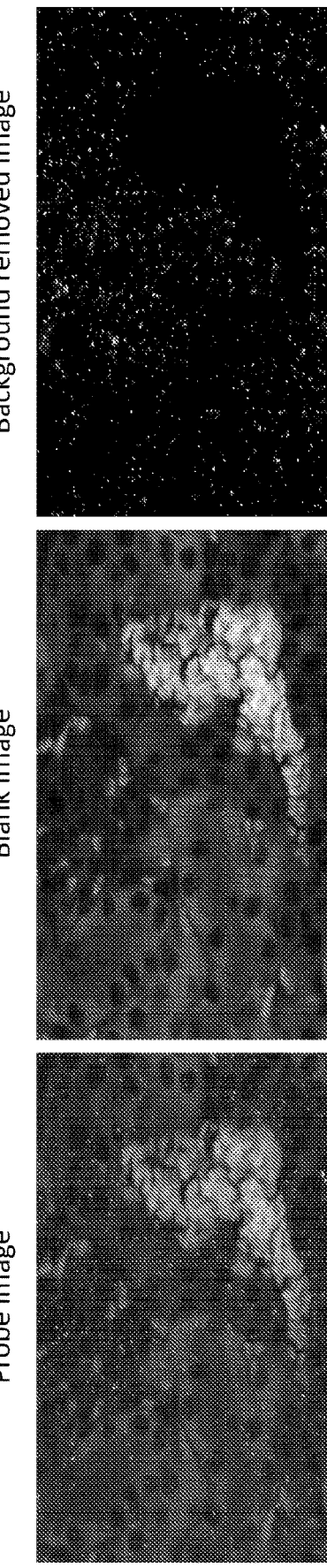
FIG. 3: Representative images of results demonstrating removal of background signals from samples of mouse kidney tissue subjected to ISH (RNAscope® HiPlex assay), according to one embodiment of the present disclosure.

FIGS. 2 and 3 include representative images of results demonstrating removal of background signals from samples of mouse lung tissue (FIG. 2) and mouse kidney tissue (FIG. 3) subjected to ISH (RNAscope® HiPlex assay). As shown in FIG. 2, the probe image (left) and the blank image (middle) were acquired with mouse lung tissue and the background removed image (right) was obtained by using the disclosed background-removal method (match distance=2, ratio factor=0.9115, and multiplication factor=1.1). In FIG. 2, the probe signals, produced by the RNAscope® HiPlex assay, can be seen as individual dots or dot clusters, which are the only signals remaining in the background removed image. Similarly, the probe image (left) and the blank image (middle) in FIG. 3 were acquired with mouse kidney tissue and the background removed image (right) was obtained by using the disclosed background-removal method (match distance=1, ratio factor=0.9604, and multiplication factor=1.1). In FIG. 3, the probe signals, produced by the RNAscope HiPlex assay, can be seen as individual dots or dot clusters, which are the only signals remaining in the background removed image.

What is claimed is:

1. A method for enhancing detection of a target, the method comprising:

imaging a sample comprising a target signal to create a probe image;

imaging the sample comprising no target signal to create a background image;

modifying the background image to create an adjusted background image based on at least one image metric;

subtracting the adjusted background image from the probe image to create a final image comprising an enhanced target signal;

determining an estimated location of the target signal in the probe image; and removing the estimated location from the probe image to create a first background-only image and removing the estimated location from the background image to create a second background-only image.

2. The method of claim 1, wherein the method further includes displaying the final image on a display.

3. The method of claim 1, wherein the target signal is obtained by subjecting the sample to a fluorescent in situ hybridization assay and/or an immunofluorescence assay.

4. The method of claim 1, wherein the background image comprising no target signal is obtained by removing the target signal from the sample.

5. The method of claim 1, wherein the at least one image metric is a ratio factor of the first background-only image and the second background-only image.

6. The method of claim 5, wherein the ratio factor is a first intensity to a second intensity, wherein the first intensity is determined from the first background-only image and the second intensity is determined from the second background-only image.

7. The method of claim 6, wherein the first intensity is the mean of a plurality of pixel intensity values in the first background-only image, and wherein the second intensity is the mean of a plurality of pixel intensity values in the second background-only image.

8. The method of claim 7, wherein the first intensity is the mean of all the pixel intensity values in the first background-only image, and wherein the second intensity is the mean of all the pixel intensity values in the second background-only image.

9. The method of claim 6, wherein the first intensity is the median of a plurality of pixel intensity values in the first background-only image, and wherein the second intensity is the median of a plurality of pixel intensity values in the second background-only image.

10. The method of claim 6, wherein the first intensity is the mean of a central 80% of all the pixel intensity values in the first background-only image, and wherein the second intensity is the mean of a central 80% of all the pixel intensity values in the second background-only image.

11. The method of claim 5, wherein modifying the background image to create an adjusted background image includes scaling the background image by the ratio factor.

12. The method of claim 1, wherein the at least one image metric is a multiplication factor to account for local intensity differences.

13. The method of claim 1, wherein the at least one image metric is a local maximum value transform.

14. The method of claim 1, wherein the at least one image metric is a block-matching transform.

15. The method of claim 1, wherein the method further includes registering the probe image and the background image.

16. The method of claim 1, wherein the target signal comprises a fluorescent label bound to a target nucleic acid, or to a target peptide or polypeptide.

17. The method of claim 1, wherein imaging the sample with no target to create the background image is performed after imaging the sample with the target to create the probe image.

18. The method of claim 1, wherein imaging the sample comprising no target to create the background image is performed before imaging the sample with the target to create the probe image.

\* \* \* \* \*